(12) United States Patent
Zumbrum et al.

(10) Patent No.: US 12,523,322 B2
(45) Date of Patent: Jan. 13, 2026

(54) UNIONS FOR JOINING FLUID CONDUITS

(71) Applicant: Sartorius Stedim FMT S.A.S., Aubagne (FR)

(72) Inventors: Michael A. Zumbrum, New Oxford, PA (US); William Kimmick, Mechanicsburg, PA (US)

(73) Assignee: Sartorius Stedim FMT, Aubagne (FR)

( * ) Notice: Subject to any disclaimer, the term of this patent is extended or adjusted under 35 U.S.C. 154(b) by 0 days.

(21) Appl. No.: 18/440,446

(22) Filed: Feb. 13, 2024

(65) Prior Publication Data
US 2024/0271728 A1    Aug. 15, 2024

Related U.S. Application Data

(60) Provisional application No. 63/445,852, filed on Feb. 15, 2023.

(51) Int. Cl.
| | |
|---|---|
| *F16L 13/10* | (2006.01) |
| *F16L 25/00* | (2006.01) |
| *F16L 31/00* | (2006.01) |
| *F16L 33/34* | (2006.01) |
| *F16L 47/02* | (2006.01) |

(52) U.S. Cl.
CPC ......... *F16L 25/0018* (2013.01); *F16L 13/103* (2013.01); *F16L 31/00* (2013.01); *F16L 33/34* (2013.01); *F16L 47/02* (2013.01)

(58) Field of Classification Search
CPC . F16L 33/30; F16L 33/34; F16L 47/02; F16L 13/103
See application file for complete search history.

(56) References Cited

U.S. PATENT DOCUMENTS

| | | | |
|---|---|---|---|
| 3,847,694 | A | 11/1974 | Stewing |
| 4,219,221 | A | 8/1980 | Webb |
| | | (Continued) | |

FOREIGN PATENT DOCUMENTS

| | | | |
|---|---|---|---|
| AU | 5211673 | A | 8/1974 |
| BE | 794882 | A | 5/1973 |
| | (Continued) | | |

OTHER PUBLICATIONS

KR-101475938-B1 Translation (Year: 2014).*

(Continued)

*Primary Examiner* — Zachary T Dragicevich
*Assistant Examiner* — Alexander T Rufrano
(74) *Attorney, Agent, or Firm* — Womble Bond Dickinson (US) LLP

(57) ABSTRACT

A union for connecting a first fluid conduit and a second fluid conduit includes a body. The body defines a central passage about a central longitudinal axis of the body with the body having a first side and a second side. The body is configured to define a first adhesive channel between a first fluid conduit and the first side of the body and to define a second adhesive channel between a second fluid conduit and the second side of the body. The body defining an injection port position at a midpoint of the body. The injection port in fluid communication with the first adhesive channel and the second adhesive channel and is configured to deliver adhesive into the first adhesive channel and the second adhesive channel.

16 Claims, 14 Drawing Sheets

(56) References Cited

U.S. PATENT DOCUMENTS

| | | | | |
|---|---|---|---|---|
| 7,748,752 | B2* | 7/2010 | Kobler | F16L 21/022 285/369 |
| 11,703,162 | B2* | 7/2023 | Vos | F16L 13/148 285/374 |
| 2010/0288438 | A1* | 11/2010 | Kobayashi | F16B 11/008 285/331 |
| 2013/0048742 | A1* | 2/2013 | Menden | F24F 5/0003 285/124.5 |
| 2017/0001368 | A1* | 1/2017 | Czinger | B29C 66/612 |

FOREIGN PATENT DOCUMENTS

| | | | | |
|---|---|---|---|---|
| BE | 821234 | A | | 4/1975 |
| CA | 983547 | A | | 2/1976 |
| CH | 547982 | A | | 4/1974 |
| CN | 107191720 | A | * 9/2017 | F16L 33/18 |
| CN | 113389953 | A | * 9/2021 | |
| DE | 1078200 | B | | 3/1960 |
| DE | 104840 | A5 | | 3/1974 |
| DK | 516374 | A | | 6/1975 |
| FI | 285974 | A7 | | 4/1975 |
| FR | 2172196 | A1 | | 9/1973 |
| FR | 2248134 | A1 | | 5/1975 |
| GB | 1384851 | A | | 2/1975 |
| IL | 41544 | A | | 11/1975 |
| IT | 978950 | B | | 9/1974 |
| IT | 1022996 | B | | 4/1978 |
| JP | S4889367 | A | | 11/1973 |
| JP | S545512 | B2 | | 3/1979 |
| JP | 2001343094 | A | | 12/2001 |
| KR | 101475938 | B1 | * | 12/2014 |
| NL | 7302042 | A | | 8/1973 |
| NL | 7412963 | A | | 4/1975 |
| SE | 410121 | B | | 9/1979 |
| WO | 2014033775 | A1 | | 3/2014 |
| ZA | 746668 | B | | 11/1975 |

OTHER PUBLICATIONS

International Search Report and Written Opinion for PCT Application PCT/IB2024/051379, issued Apr. 30, 3024, 13 pages.
International Preliminary Report on Patentability for PCT/IB2024/051379 issued Aug. 15, 2025, 8 pages.
International Search Report and Written Opinion for PCT Application PCT/IB2024/051379, issued Apr. 30, 2024, 5 pages.

* cited by examiner

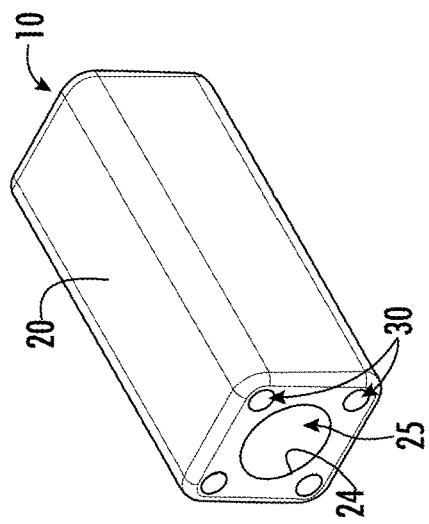
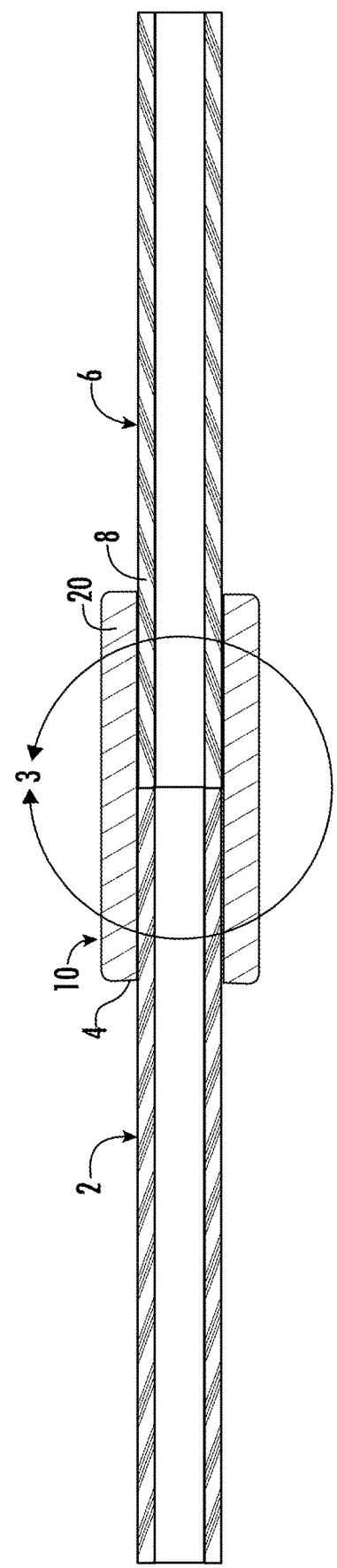
FIG. 1
FIG. 2

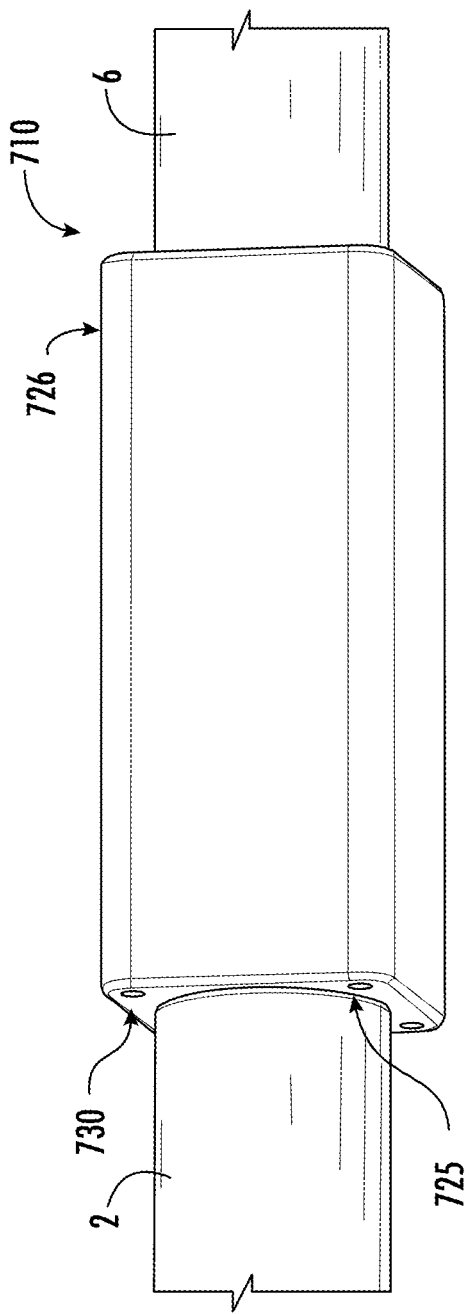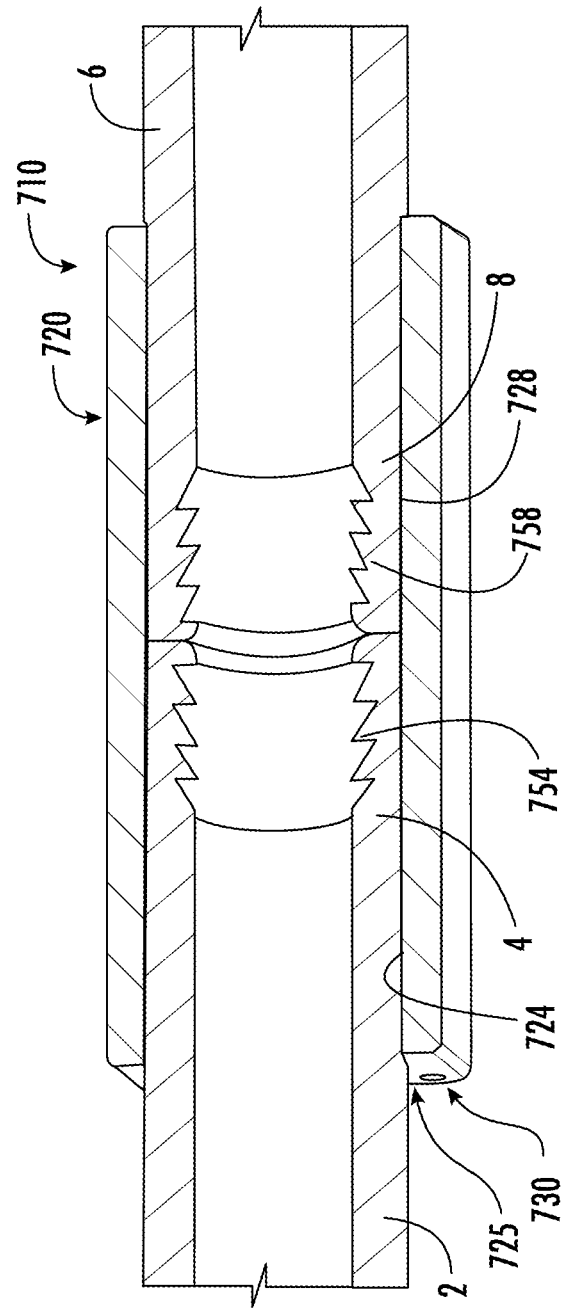

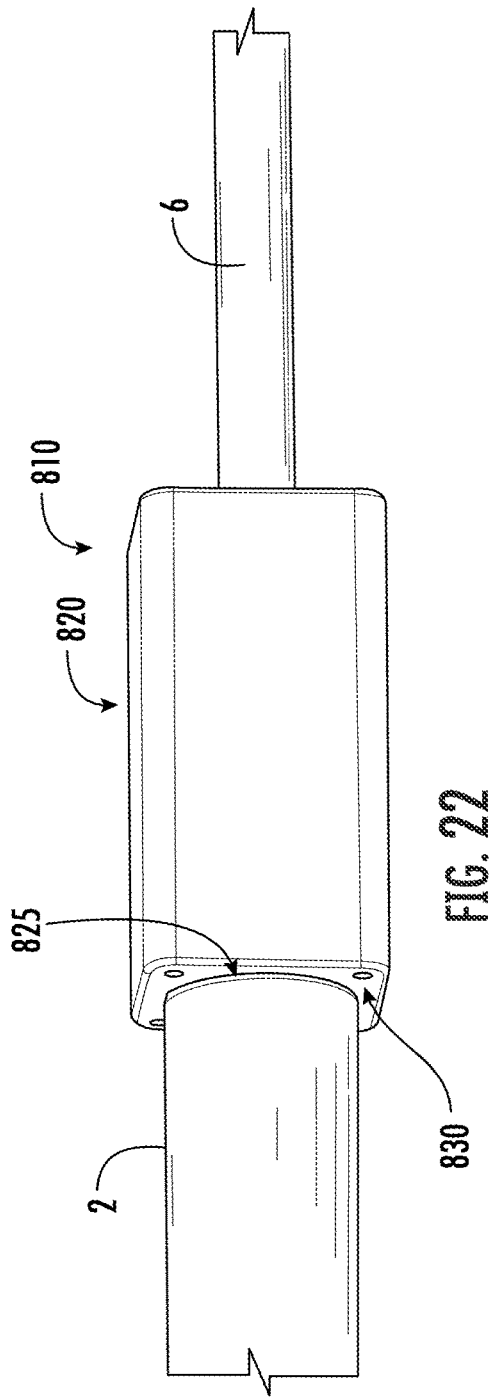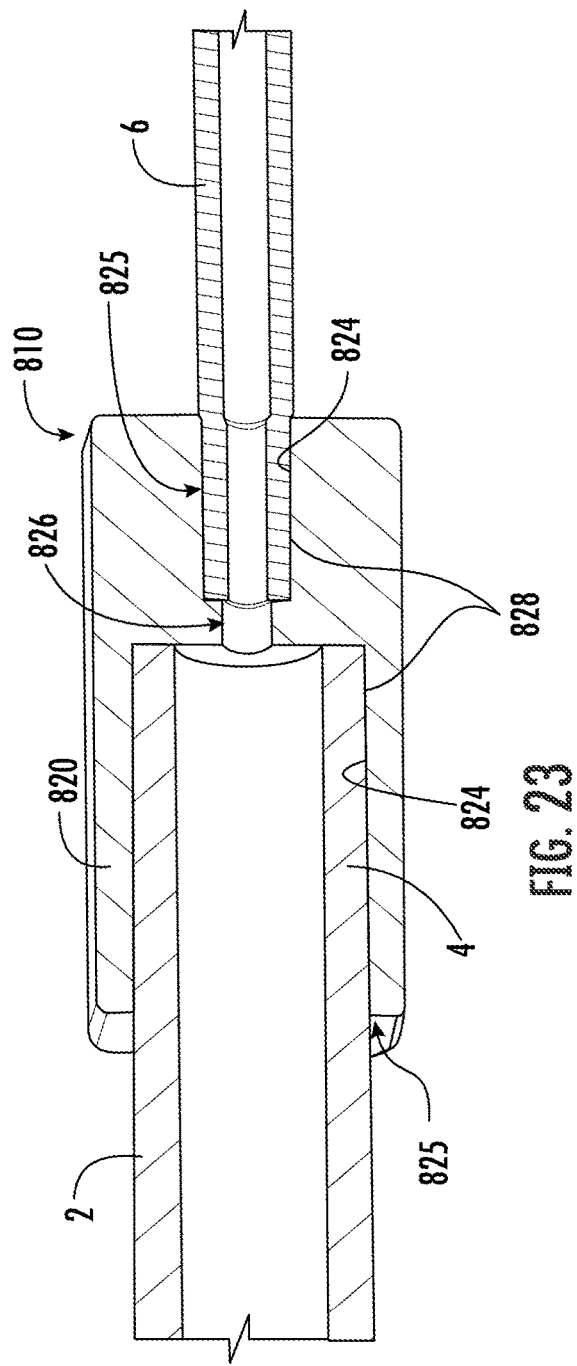

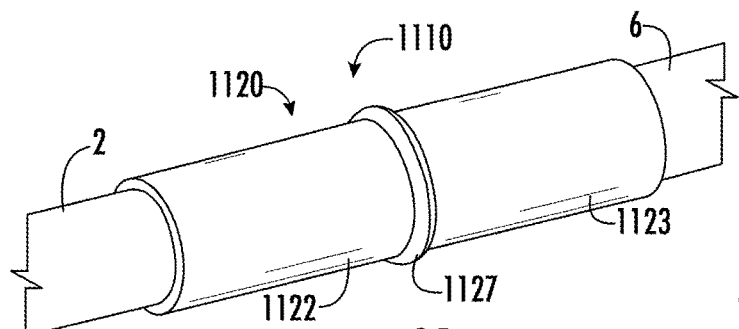
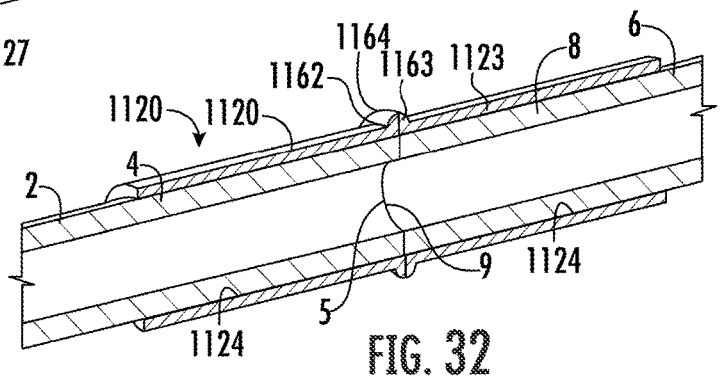
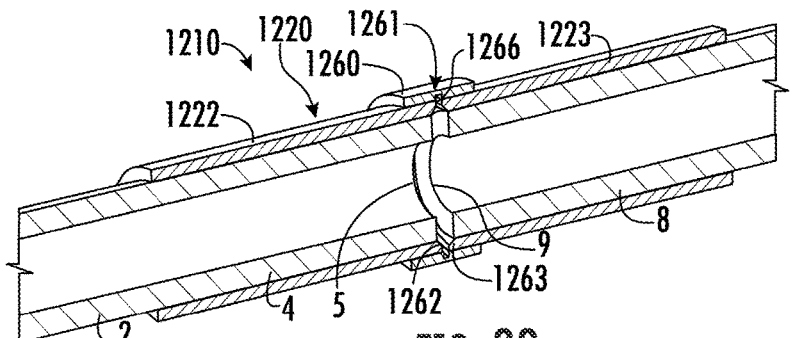
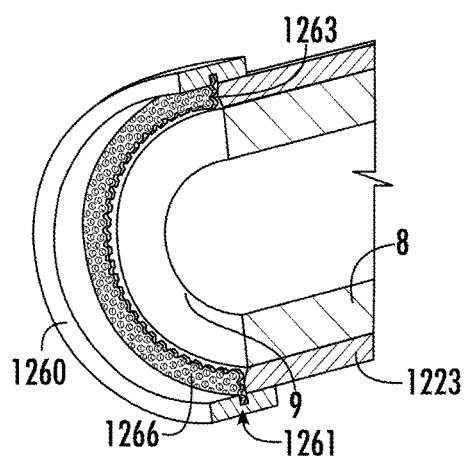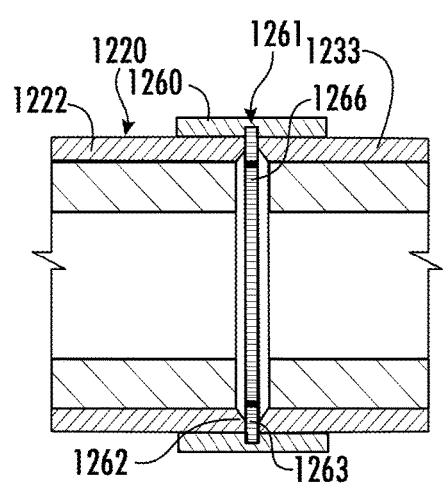
FIG. 31
FIG. 32
FIG. 33
FIG. 34
FIG. 35

UNIONS FOR JOINING FLUID CONDUITS

CROSS-REFERENCE TO RELATED APPLICATION

This application claims benefit of, and priority to, U.S. Provisional Patent Application Ser. No. 63/445,852, filed Feb. 15, 2023, the entire contents of which are hereby incorporated by reference.

BACKGROUND

1. Technical Field

The present disclosure relates to unions for fluid conduits and, more specifically, to unions for joining fluid conduits.

2. Discussion of Related Art

Biopharmaceutical and pharmaceutical drug developers and manufactures often develop and manufacture products in a fluid form. These products must be handled with care to maintain an aseptic environment and avoid contamination. Drugs developed and produced by biopharmaceutical and pharmaceutical companies are often produced through a multitude of steps that may require transfer of the drugs or media in fluid form through conduits for purposes of sampling, packaging, mixing, separating, or passing between stations for various steps of the manufacturing process.

As the media is transferred through fluid conduits, it may be necessary to connect one fluid conduit to another fluid conduit to allow media to flow therethrough. Joining fluid conduits may be difficult as some fluid conduits are not weldable or may be difficult to join.

SUMMARY

This disclosure relates generally to unions and methods for aseptically securing two fluid conduits together.

In an aspect of the present disclosure, a union for connecting a first fluid conduit and a second fluid conduit includes a body. The body defines a central passage about a central longitudinal axis of the body with the body having a first side and a second side. The first side is configured to secure a first fluid conduit to the body and the second side is configured to secure a second fluid conduit to the body. The body is configured to define a first adhesive channel between the first fluid conduit and the first side of the body and to define a second adhesive channel between the second fluid conduit and the second side of the body. The body defining an injection port position at a midpoint of the body. The injection port in fluid communication with the first adhesive channel and the second adhesive channel and is configured to deliver adhesive into the first adhesive channel and the second adhesive channel with the first fluid conduit and the second fluid conduit disposed about or within the first side and the second side, respectively.

In aspects, the body has an outer wall that forms an outer surface of the first side and the second side. The outer wall may be configured to receive the first fluid conduit thereabout and the second fluid conduit thereabout. The outer wall may include ridges that increase the surface area of the outer surface.

In some aspects, the body includes a protrusion that extends from the outer wall of the body between the first side and the second side. The protrusion may have a first sidewall that is configured to abut the first fluid conduit when the first fluid conduit is disposed about the first side. The protrusion having a second sidewall that is configured to abut the second fluid conduit when the second fluid conduit is disposed about the second side. The protrusion may define the injection port. The protrusion may define a first tunnel and a second tunnel that extend from the injection port to the outer wall of the first side and the second side of the body to place the injection port in fluid communication with the first adhesive channel and the second adhesive channel when the first fluid conduit and the second fluid conduit are disposed about the first side and the second side, respectively.

In certain aspects, the body includes a first barb that extends from the outer wall adjacent a first end of the body and a second barb that extends from the outer wall adjacent a second end of the body. The first barb may be configured to engage an inside surface of the first fluid conduit to secure the first fluid conduit to the first side. The second barb is configured to engage an inside surface of the second fluid conduit to secure the second fluid conduit to the second side. The first barb may form a first channel end for the first adhesive channel and the second barb may form a second channel end of the second adhesive channel.

In particular aspects, the central passage is configured to receive the first fluid conduit and the second fluid conduit therein such that the first side and the second side are disposed about the first fluid conduit and the second fluid conduit, respectfully. The first side of the body may be configured to define the first adhesive channel with the outer surface of the first fluid conduit. The second side of the body may be configured to define the second adhesive channel with an outer surface of the second fluid conduit. The body includes an inner wall that defines the central passage that defines a groove that is in fluid communication with the central passage and has a diameter greater than the central passage. The groove may be disposed adjacent a midpoint of the body and spaced apart from each end of the body. The groove may define the first adhesive channel and the second adhesive channel with the first fluid conduit and the second fluid conduit, respectively. The body may define a well at the midpoint thereof. The well may be in fluid communication with the first adhesive channel and the second adhesive channel and the injection port. The well may have a diameter larger than the first adhesive channel and the second adhesive channel. The inner wall of the body may include ridges to increase a surface area of the inner wall.

In some aspects, the body has a relaxed state in which the central passage has a relaxed diameter and an expanded state in which the central passage has an expanded diameter that is larger than the relaxed diameter. The relaxed diameter may be sized and dimensioned to be equal to or less than an outer diameter of a fluid conduit to be received within the central passage. The expanded diameter may be sized and dimensioned to be greater than the outer diameter of a fluid conduit to be received within the central passage. The body may define expansion passages disposed about and adjacent to the central passage. The expansion passages may be configured to be engaged to stretch the body from the relaxed state to the expanded state.

In certain aspects, the first side defines a first section of the central passage that has a first diameter and the second side may define a second section of the central passage that has a second diameter that is different from the first diameter.

A union for connecting a first fluid conduit and a second fluid conduit includes a body. The body includes an inner wall that defines a central passage about a central longitudinal axis of the body. The body has a first side and a second side. The body has a relaxed state in which the central passage has a relaxed diameter and an expanded state in which the central passage defines an expanded diameter that is larger than the relaxed diameter. The relaxed diameter is sized and dimensioned to be equal to or less than an outer diameter of the fluid conduits to be received within the central passage. The expanded diameter is sized and dimensioned to be greater than the outer diameter of a fluid conduit to be received within the central passage.

In aspects, the body defines expansion passages that are disposed about and adjacent to the central passage. The expansion passages are configured to be engaged to stretch the body from the relaxed state to the expanded state. The body may define four expansion passages that are disposed about the central passage. The expansion passages may extend through the body. Each expansion passage may be defined about an expansion axis that is parallel to the central longitudinal axis. The body may be substantially rectangular in shape with each expansion passage adjacent a respective corner of the body.

In some aspects, the union includes expansion pins that are received within the expansion passages with each expansion pin received within an expansion passage. The expansion pins may be engageable to transition the body from the relaxed state to the expanded state. A portion of the expansion pins may be exposed adjacent a midpoint of the body.

In certain embodiments, the body includes expansion lugs that are disposed about and adjacent to the central passage. The expansion lugs may be configured to be engaged to stretch the body from the relaxed state to the expanded state. Each expansion lug may be substantially cylindrical in shape and extend in a direction parallel to the central longitudinal axis of the body.

In particular aspects, in the relaxed state, the body is configured to compress the outer surfaces of the fluid conduits received within the central passage.

In certain embodiments, the union includes an insert that is configured to be disposed within a lumen defined by the first fluid conduit and the second fluid conduit. The insert may be configured to support an inner surface of the first fluid conduit and the second fluid conduit in response to compression of the outer surface of the first fluid conduit and the second fluid conduit by the body. The insert may include an abutment ring that is disposed at a midpoint of the insert. The abutment ring may have a diameter greater than the lumen of the first fluid conduit and the second fluid conduit. The abutment ring may be configured to be engaged by an end of the first fluid conduit and an end of the second fluid conduit.

In some aspects, the union includes a first insert that is configured to be disposed within the first fluid conduit. The first insert may be sized and dimensioned to urge the first fluid conduit outwards towards the inner wall of the body, the first insert may be configured to support the first fluid conduit. The union may include a second insert that is configured to be disposed within the second fluid conduit. The second insert may be sized and dimensioned to urge the second fluid conduit outwards towards the inner wall of the body. The second insert may be configured to support the second fluid conduit.

In particular aspects, the first side defines a first section of the central passage having a first diameter and the second side defines a second section of the central passage that has a second diameter that is different from the first diameter.

In aspects, the union includes an adhesive applied to the inner wall. The adhesive may be configured to secure the union to the outer surfaces of the first fluid conduit and the second fluid conduit that are disposed within the central passage of the union. The body may define a well and an injection port. The well may be in fluid communication with the central passage and positioned at a midpoint of the body. The injection port may be in fluid communication with the well and extend through an outer wall of the body. The injection port may be configured to receive an adhesive to fill the well and secure an end portion of the first fluid conduit to the second fluid conduit received within the central passage of the body.

In another aspect of the present disclosure, an assembly includes a first fluid conduit, a second fluid conduit, and a union. The union may be any of the unions detailed herein. The assembly may include an adhesive that is disposed between the body of the union and the first fluid conduit and disposed between the body of the union and the second fluid conduit to secure the first fluid conduit and the second fluid conduit to the union such that the first fluid conduit and the second fluid conduit are in fluid communication with one another.

In certain aspects, the assembly does not include adhesive. In such embodiments, an end portion of the first fluid conduit and an end portion of the second fluid conduit are treated such that when contacted by the union, the end portion of the first fluid conduit and the end portion of the second fluid conduit are bonded to the body of the union.

In another aspect of the present disclosure, a method of joining two fluid conduits in an aseptic manner includes positioning a first fluid conduit over or within a first side of a body of a union and positioning a second fluid conduit over or within a second side of the body such that a lumen of the first fluid conduit is in fluid communication with a lumen of the second fluid conduit. The method may include injecting an adhesive through an injection port that is defined in the body such that the adhesive flows into a first adhesive channel that is defined between the body and the first fluid conduit and a second adhesive channel that is defined between the body and the second fluid conduit. In such embodiments, the method includes curing the adhesive such that the first fluid conduit and the second fluid conduit are bonded to the body.

In aspects, injecting the adhesive through the injection port includes the first adhesive channel and the second adhesive channel being a single continuous adhesive channel. Positioning the first fluid conduit includes positioning the first fluid conduit over the first side of the body until an end of the first fluid conduit abuts a protrusion of the body. The protrusion of the body may define the injection port. Injecting the adhesive through the injection port may include the adhesive flowing through tunnels that fluidly connect the injection port and the first fluid channel and the second fluid channel.

In certain aspects, positioning the first fluid conduit includes positioning the first fluid conduit within the first side of the body and positioning the second fluid conduit includes positioning the second fluid conduit within the second side of the body. Injecting the adhesive through the injection port may include the adhesive flowing into a first adhesive channel that is defined between the body and an outside surface of the first fluid conduit. The method may include expanding the body before positioning the first fluid conduit and positioning the second fluid conduit.

In some aspects, the method includes surface treating end portions of the first fluid conduit and the second fluid conduit such that when the body of the union contacts the end portions, the end portions are bonded to the body. In such aspects, the surface treatments may include UV treating of the end portions. In such aspects, the bond to the body may be formed without adhesives.

In another aspect of the present disclosure, a method of joining two fluid conduits in an aseptic manner includes opening a first sealed disconnect device that is crimped closed to open an end of the first fluid conduit and opening a second sealed disconnect device that is crimped closed to open an end of a second fluid conduit. The method includes positioning the end of the first fluid conduit including the opened first disconnect device within a first side of the body of the union and positioning the end of the second fluid conduit including the opened second disconnect device within a second side of the body such that a lumen of the first fluid conduit is in fluid communication with a lumen of the second fluid conduit. The method also includes crimping an outer crimp tube of the body over the end of the first fluid conduit such that the body is sealingly secured to the first fluid conduit and crimping the outer crimp tube of the body over the end of the second fluid conduit such that the body is sealingly secured to the second fluid conduit.

In aspects, crimping the outer crimp tube of the body includes compressing an inner tube of the body between the outer crimp tube and the first fluid conduit and the second fluid conduit. The method may include placing a first insert in the end of the first fluid conduit after opening the first sealed disconnect and before positioning the end of the first fluid conduit within the first side of the body and may include placing a second insert in the end of the second fluid conduit after opening the second sealed disconnect and before positioning the end of the second fluid conduit within the second side of the body. The method may include placing portion of the insert in the end of the first fluid conduit after opening the first sealed disconnect and before positioning the end of the first fluid conduit within the first side of the body and placing another portion of the insert in the end of the second fluid conduit after opening the second sealed disconnect and before positioning the end of the second fluid conduit within the second side of the body.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein:

FIG. 1 is a perspective view of a union provided in accordance with embodiments of the present disclosure;

FIG. 2 is a longitudinal cross-sectional view of the union of FIG. 1 connecting two fluid conduits together with a body of the union in a relaxed state;

FIG. 20 is a perspective view of another union connecting two fluid conduits together provided in accordance with embodiments of the present disclosure;

FIG. 21 is a perspective, longitudinal cross-sectional view of the union and the fluid conduits of FIG. 20 illustrating a support within each fluid conduit;

FIG. 22 is a perspective view of another union connecting two fluid conduits having different diameters together provided in accordance with embodiments of the present disclosure;

FIG. 23 is a perspective, longitudinal cross-sectional view of the union and the fluid conduits of FIG. 22;

FIG. 31 is a perspective view of another union connecting two fluid conduits together provided in accordance with embodiments of the present disclosure;

FIG. 32 is a perspective, longitudinal cross-sectional view of a portion of the union and the fluid conduits of FIG. 31;

FIG. 33 is a perspective, longitudinal cross-sectional view of another union connecting two fluid conduits together provided in accordance with embodiments of the present disclosure;

FIG. 34 is a perspective, longitudinal end view of the union and an end portion of a fluid conduit of FIG. 33;

FIG. 35 is a longitudinal cross-sectional view of a portion of the union and the fluid conduits of FIG. 33;

DETAILED DESCRIPTION

Figure 3A:
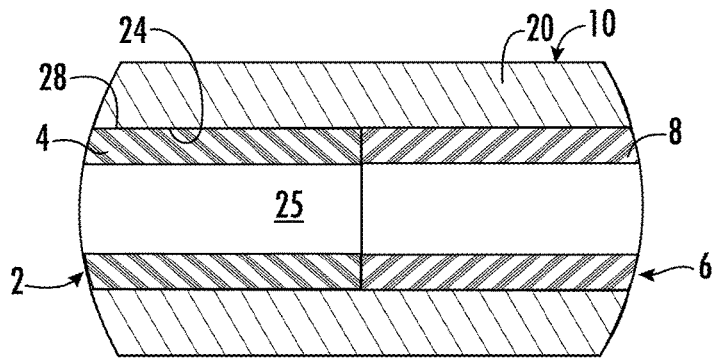
FIG. 3A is an enlarged view of the indicated portion of FIG. 2.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

This disclosure is generally directed to a union between two or more fluid conduits or conduits. The union may be used to form an aseptic connection between the two fluid conduits or conduits. The unions disclosed herein may be for use with empty fluid conduits or when one or more of the fluid conduits are filled. One or both of the fluid conduits to be joined may be sealed after a vessel in fluid communication with the fluid conduit is filed with fluid material. One such seal may be formed with a QuickSeal™ available from Sartorius. To form an aseptic connection between two fluid conduits, the fluid conduits may be placed in a machine which cuts the ends of the fluid conduits such that the fluid conduits allow fluid to flow therethrough, e.g., cut ends to remove seal from the end of the fluid conduits within the machine. In embodiments, the ends of the fluid conduits may be suitable for connecting before being placed in the machine. In such embodiments, the ends of the fluid conduits may be connected without being cut. The machine may then sterilize end portions of the fluid conduits to be connected. Next, the machine may expand or stretch a union for the fluid conduits and then the end portions of the fluid conduits are inserted into the union. The union is then released such that the union compresses the end portions of the fluid conduits as adhesive on an inside surface of the union fixes the end portions therewithin. Once the union is fixed to the end portions, the machine may be opened with an aseptic connection formed between the two fluid conduits. In certain embodiments, the machine may connect two fluid conduits and then the two fluid conduits and the union may be sterilized after being connected, e.g., ultra-violet light, X-rays, gamma rays, vaporized hydrogen peroxide (VHP), ozone, ethylene oxide, or other oxidizing agents. As detailed below, in certain embodiments, the fluid conduits may be disposed over the union and adhesive added between the union and the fluid conduits to secure the fluid conduits to the union and thus, one another. In particular embodiments, the fluid conduits may be disposed within the union without stretching of the union.

Referring now to FIGS. 1-5, an example union 10 for connecting two fluid conduits 2, 6 is disclosed in accordance with the present disclosure. In embodiments, the connection between the two fluid conduits 2, 6 may be an aseptic connection. The union 10 includes a generally rectangular shaped body 20 that includes an inner wall 24 disposed about the central longitudinal axis of the body. The inner wall 24 defines a central passage 25 that extends longitudinally through the body 20. The central passage 25 may be disposed about the central longitudinal axis of the body 20. The central passage 25 may be circular in cross-section or may be ovular or elliptical in cross-section. The body 20 has a relaxed state in which the central passage 25 has a relaxed diameter that is equal to or smaller than an outer diameter of the fluid conduits to be connected by the union 10 as shown in FIG. 3A. For example, the relaxed diameter of the central passage 25 may be in a range of 0 percent to 50 percent, e.g., 1 percent to 50 percent or 1 percent to 10 percent, smaller than the outer diameter of end portions 4, 8 of the fluid conduits 2, 6 to be connected such that the inner wall 24 is engaged with the outer diameter to secure the end portions 4, 8 of the fluid conduits 2, 6 therewithin. The body 20 has a first side that is configured to secure to the one fluid conduit and a second side that is configured to secure to the other fluid conduit.

The inner wall 24 may include one or more adhesives 28 disposed thereon to fix the end portions 4, 8 of the fluid conduits 2, 6 therewithin. The one or more adhesives 28 may self-cure when in contact with the end portions 4, 8 of the fluid conduits 2, 6 or may be UV cured once the end portions 4, 8 of the fluid conduits 2, 6 are disposed therein or may be attached by way of a pressure sensitive adhesive, e.g., Momentive PSA 595. In some embodiments, the outer surfaces of the end portions 4, 8 of the fluid conduits 2, 6 receive a surface treatment that increases the adhesion of adhesives or may allow for the joining of the fluid conduits 2, 6 with the union 10 without the use of adhesive. Such a surface treatment may be a deep UV surface treatment (VUV surface treatment) as described in Dr. Sigmar Rudakowski, "UV light—A powerful tool for surface treatment" (2010), available at https://www.circuitnet.com/news/uploads/1/Xeradex_VUV.pdf.

Figure 3B:
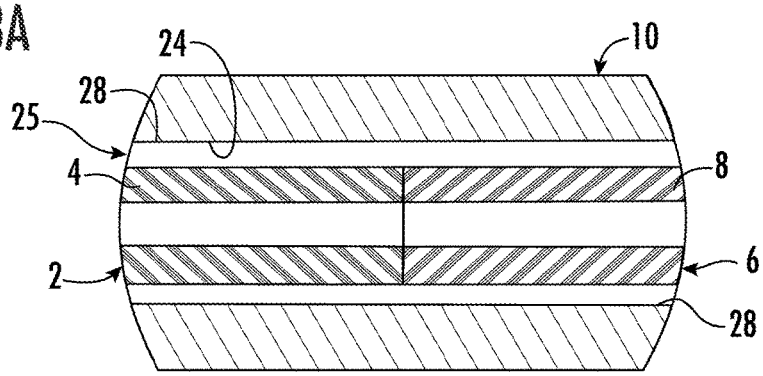
FIG. 3B is the enlarged view of FIG. 3A with the body of the union in an expanded state.
Figure 4:
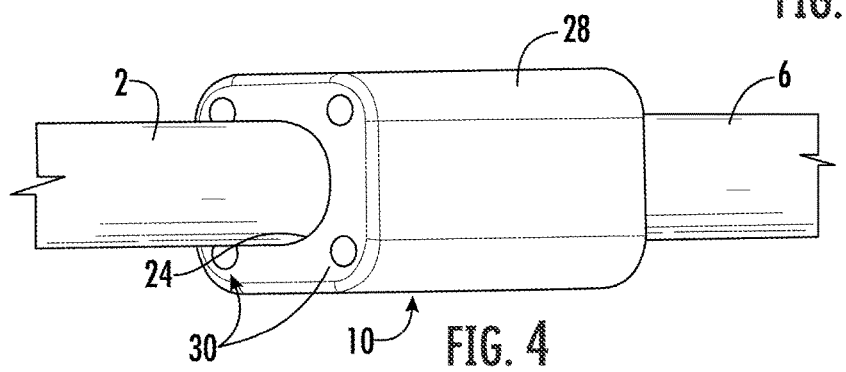
FIG. 4 is a perspective view of the union of FIG. 1 connecting two fluid conduits together.
Figure 5:
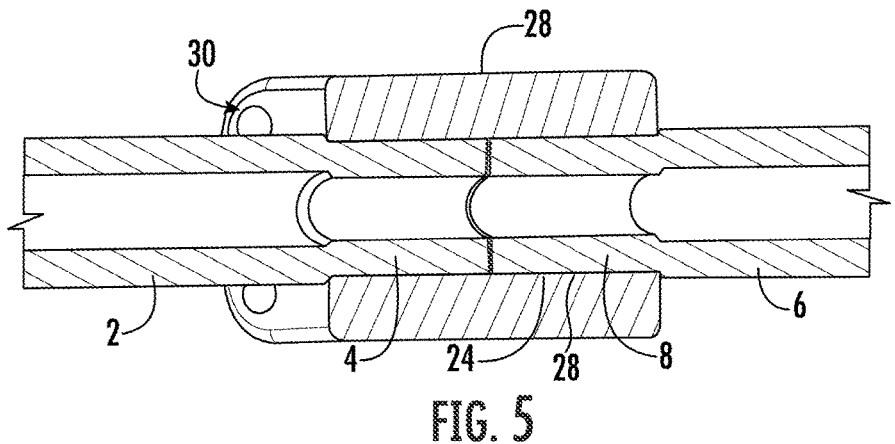
FIG. 5 is a perspective, longitudinal cross-sectional view of the union and the fluid conduits of FIG. 4.

With particular reference to FIGS. 1, 3B, and 4, the body 20 includes expansion elements defined therethrough. As shown, the expansion elements of the body 20 are expansion passages 30 that are defined longitudinally through the body 20 about the central passage 25. Each expansion passage 30 may be cylindrical or circular in cross-section. The expansion passages 30 are disposed about the central passage 25 such that when the expansion passages 30 are drawn apart from one another, the central passage 25 is expanded or enlarged to an expanded diameter. The expanded diameter is larger than the outer diameter of the fluid conduits 2, 6 to be connected by the union 10 as shown in FIG. 3B. As shown, the body 20 includes four expansion passages 30 disposed about and adjacent to the central passage 25 and positioned adjacent each corner of the body 20. In some embodiments, the body 20 may include three, five, or more expansion passages 30 defined therethrough.

A machine (not shown) may include pins that are inserted into the expansion passages 30 of the body 20 and then moved apart from one another to stretch the body 20 of the union from the relaxed state to the expanded state as shown in FIG. 3B. In the expanded state, the body 20 is expanded such that a diameter of the central passage 25 is increased to an expanded diameter in which the expanded diameter is larger than an outer diameter of the fluid conduits 2, 6. In some embodiments, the machine may be disposed in an aseptic enclosure separate from a laboratory or working facility such that the fluid conduits 2, 6 may be positioned in the enclosure and the machine prepares the end portions 4, 8 of the fluid conduits 2, 6, e.g., cutting or otherwise prepare, and then expands the body 20 and inserts the fluid conduits 2, 6 into the central passage 25 and then relaxes the body 20 over the fluid conduits 2, 6. In particular embodiments, the adhesive may be cured in the enclosure. In certain embodiments, a hand tool may be used to expand the body 20 in a similar manner.

As shown, the body 20 includes four expansion passages 30 and the machine includes a complementary number of expansion pins that pass through the expansion passages 30. In some embodiments, the body 20 may include three, five, or more expansion passages 30 defined therethrough and the machine includes accompanying expansion pins as the number of expansion passages. When the expansion pins are received within the expansion passages 30, the expansion pins move away from the central longitudinal axis such that the diameter of the central passage 25 increases to the expanded diameter such that the central passage 25 can receive the fluid conduits 2, 6 therein without interfering with an outer diameter of the end portions 4, 8 of the fluid conduits 2, 6. When the end portions 4, 8 of the fluid conduits 2, 6 abut one another within the central passage 25 of the union 10, the machine relaxes the expansion pins such that the body 20 of the union 10 relaxes such that the inner wall 24, and the adhesive 28 thereof, engages the outer surface of the end portions 4, 8. The body 20 may be self-biased to return the central passage 25 to the relaxed diameter absent external forces thereon. The adhesive 28 is then cured to fix the end portions 4, 8 within the union 10.

Figure 6:
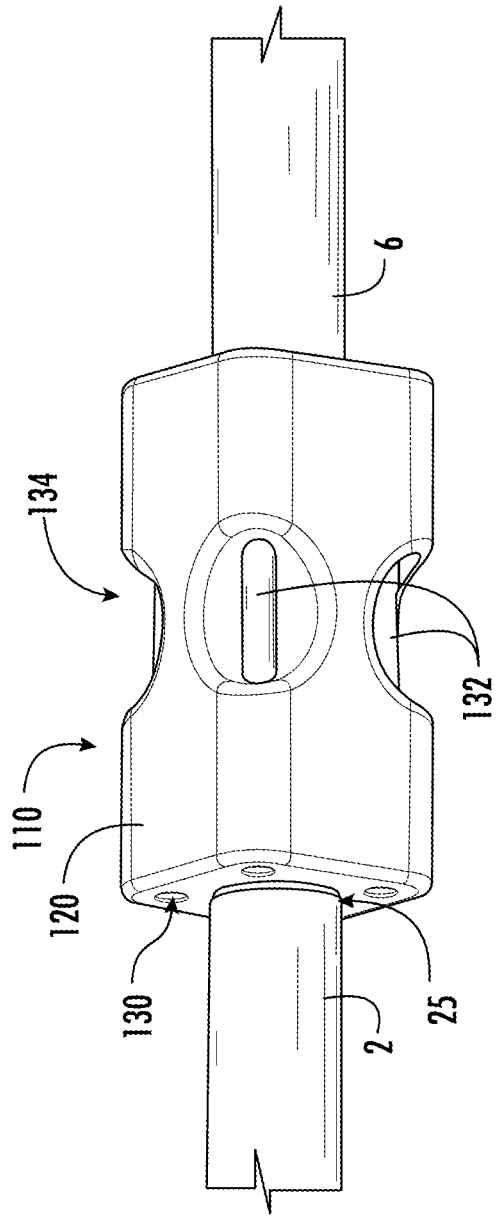
FIG. 6 is a perspective view of another union connecting two fluid conduits together provided in accordance with embodiments of the present disclosure.
Figure 7:
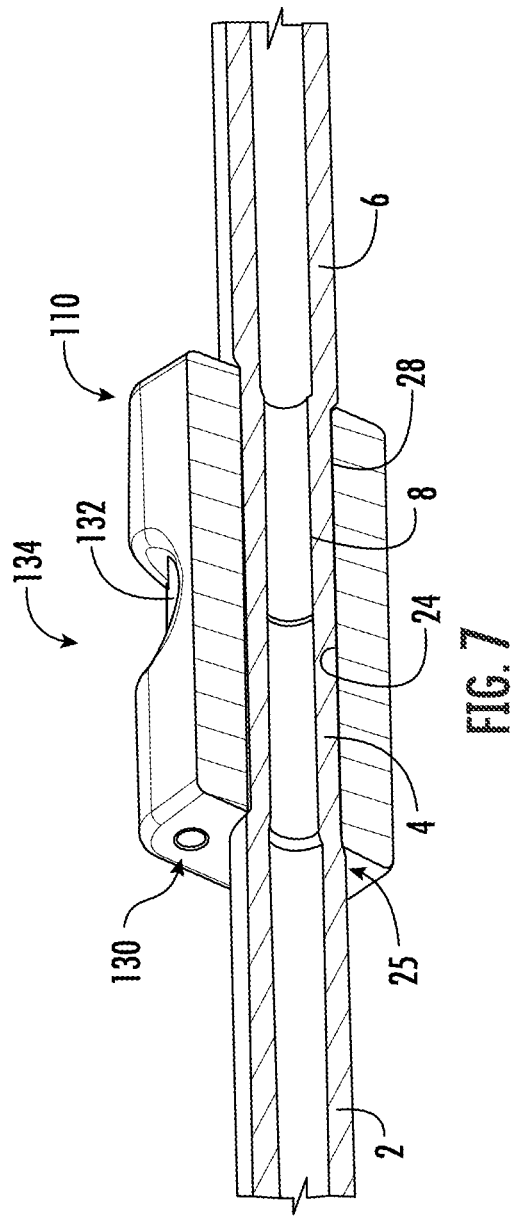
FIG. 7 is a perspective, longitudinal cross-sectional view of the union and the fluid conduits of FIG. 6.

With reference to FIGS. 6 and 7, another union 110 for connecting two fluid conduits 2, 6 is disclosed in accordance with the present disclosure. The union 110 is similar to the union 10 detailed above with similar elements including a similar label including a leading "1" added to the label with only the differences detailed herein for brevity.

The union 110 includes expansion elements in the form of expansion pins 132 that are received in expansion passages 130 that pass through the body 120. The body 120 includes expansion cutouts 134 to provide access to the expansion pins 132. The expansion engagement of the machine grips or engages the expansion pins 132 to expand the central passage 125 of the union 110 to the expanded diameter and to relax the body 120 of the union 110 such that the central passage 125 returns to the relaxed diameter.

Figure 8:
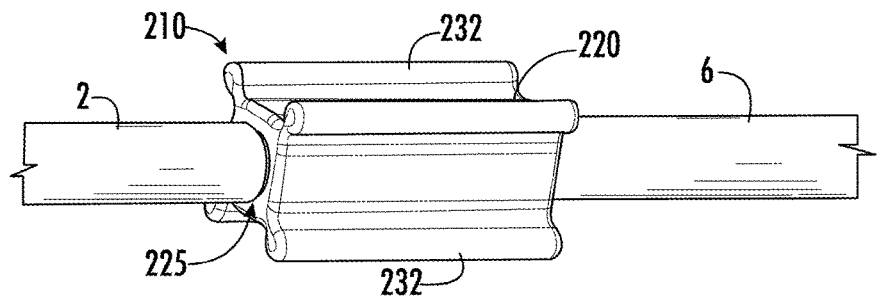
FIG. 8 is a perspective view of another union connecting two fluid conduits together provided in accordance with embodiments of the present disclosure.
Figure 9:
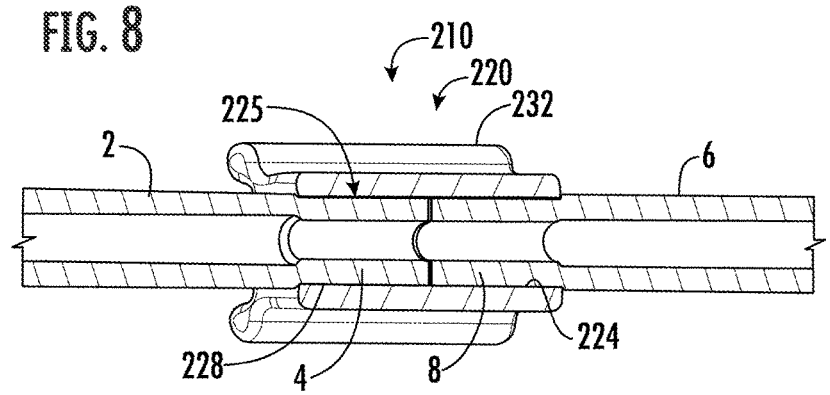
FIG. 9 is a perspective, longitudinal cross-sectional view of the union and the fluid conduits of FIG. 8.

With reference to FIGS. 8 and 9, another union 210 for connecting two fluid conduits is disclosed in accordance with the present disclosure. The union 210 is similar to the union 10 detailed above with similar elements including a similar label including a leading "2" added to the label with only the differences detailed herein for brevity.

The union 210 includes expansion elements in the form of expansion lugs 232 that extend from the body 220. The expansion lugs 232 are disposed about the central passage 225. In some embodiments, the expansion lugs 232 may extend or be attached to corners of the body 220. The expansion engagement of the machine grips or engages the expansion lugs 232 to expand the central passage 225 of the union 210 to the expanded diameter and to relax the body 220 of the union 210 such that the central passage 225 returns to the relaxed diameter.

Figure 10:
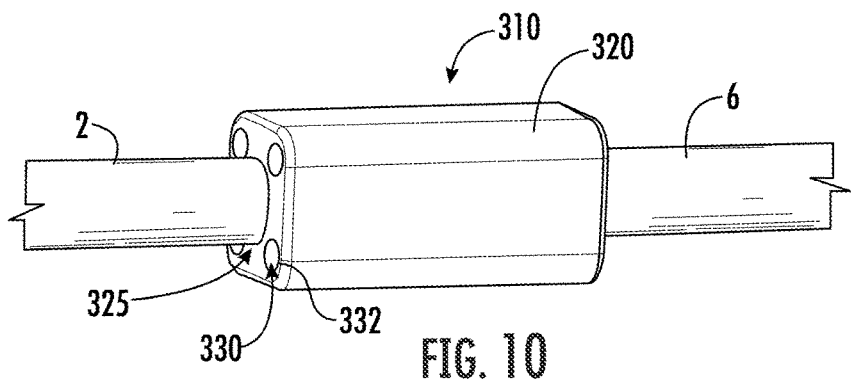
FIG. 10 is a perspective view of another union connecting two fluid conduits together provided in accordance with embodiments of the present disclosure.
Figure 11:
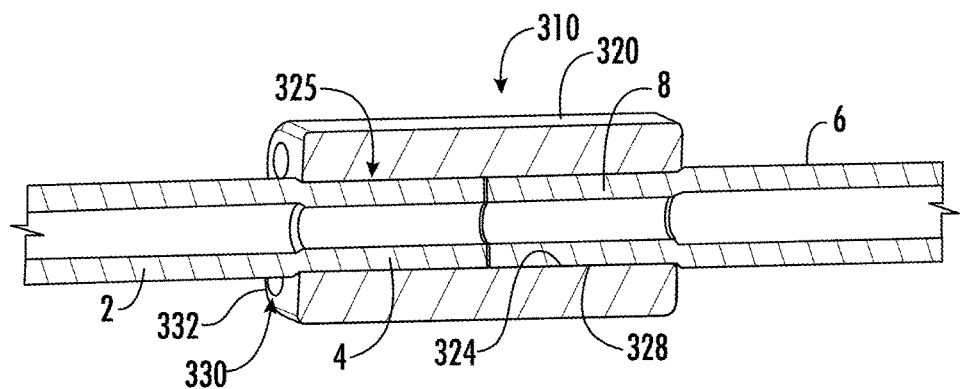
FIG. 11 is a perspective, longitudinal cross-sectional view of the union and the fluid conduits of FIG. 10.

With reference to FIGS. 10 and 11, another union 310 for connecting two fluid conduits is disclosed in accordance with the present disclosure. The union 310 is similar to the union 10 detailed above with similar elements including a similar label including a leading "3" added to the label with only the differences detailed herein for brevity.

The union 310 includes expansion elements in the form of expansion tubes 332 that are received in expansion passages 330 that pass through the body 320. The expansion engagement of the machine may be expansion pins or shafts that pass into the expansion tubes 332 to expand the central passage 325 of the union 310 to the expanded diameter and to relax the body 320 of the union 310 such that the central passage 325 returns to the relaxed diameter. The expansion tubes 332 may be rigid enough such that the expansion pins or shafts of the machine do not need to pass entirely through the expansion tubes 332 to expand or stretch the body 320. For example, the pins of the machine may only extend 25 percent to 75 percent of the length of the body 320 into the expansion tubes 332. The expansion tubes 332 may reduce or prevent damage to the body 320 as a result of insertion and removal of the pins from the expansion passages 330. The expansion tubes 332 may reduce or prevent damage to the body 320 as a result of engagement of pins of the machine with the body 320 during expansion of the body 320.

Figure 12:
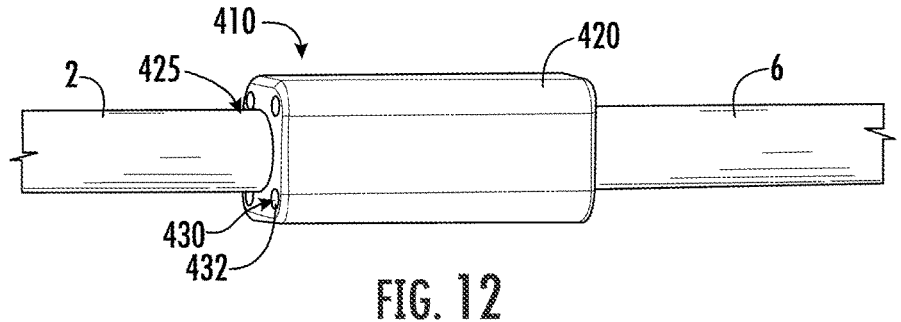
FIG. 12 is a perspective view of another union connecting two fluid conduits together provided in accordance with embodiments of the present disclosure.
Figure 13:
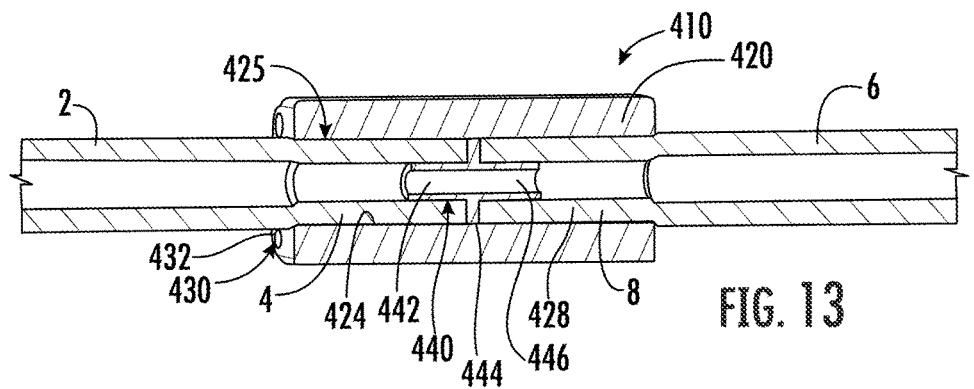
FIG. 13 is a perspective, longitudinal cross-sectional view of the union and the fluid conduits of FIG. 12 illustrating an insert within the fluid conduits.

With reference to FIGS. 12 and 13, another union 410 for connecting two fluid conduits is disclosed in accordance with the present disclosure. The union 410 is similar to the union 310 detailed above with similar elements including a similar label including a leading "4" on the label instead of the leading "3" with only the differences detailed herein for brevity.

The union 410 includes expansion elements in the form of expansion tubes 432 that are received in expansion passages 430 that pass through the body 420. In some embodiments, the union 410 may be provided without the expansion tubes 432 such that pins of a machine may be inserted directly into the expansion passages 430.

The union 410 includes a fluid conduit insert 440 that is received within the fluid conduits 2, 6 to be connected. The union 410 may be disposed at a midpoint of the body 420. The fluid conduit insert 440 includes a first segment 442 that is received within the end portion 4 of the fluid conduit 2 and a second segment 446 that is received within the end portion 8 of the fluid conduit 6. The first and second segments 442, 446 may have an outer diameter slightly larger than an inner diameter of the fluid conduits 2, 6 such that the fluid conduits 2, 6 are expanded when received over the first and second segments 442, 446. The fluid conduit insert 440 may include an abutment ring 444 that extends beyond the outer surface of the first and second segments 442, 446 and has a diameter similar to the outer diameter of the fluid conduits 2, 6. In some embodiments, the abutment ring 444 has a diameter between the inner diameter of the fluid conduits 2, 6 and the outer diameter of the fluid conduits 2, 6. The end portions 4, 8 of the fluid conduits 2, 6 may abut the abutment ring 444. The fluid conduit insert 440 may support the fluid conduits 2, 6 to prevent the fluid conduits 2, 6 from collapsing under the constriction or compression of the union 410.

Figure 14:
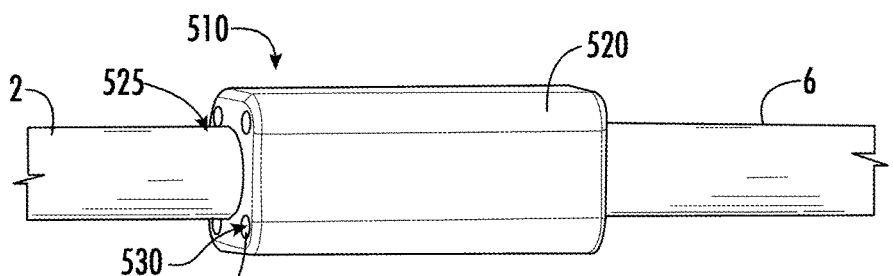
FIG. 14 is a perspective view of another union connecting two fluid conduits together provided in accordance with embodiments of the present disclosure.
Figure 15:
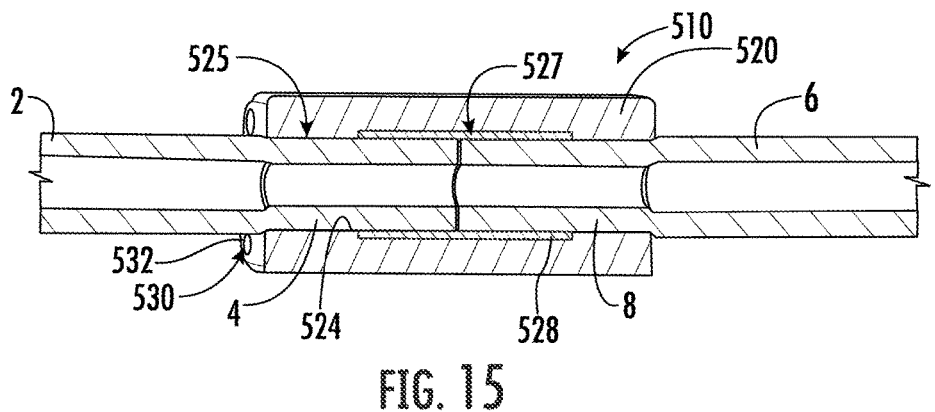
FIG. 15 is a perspective, longitudinal cross-sectional view of the union and the fluid conduits of FIG. 14.

With reference to FIGS. 14 and 15, another union 510 for connecting two fluid conduits is disclosed in accordance with the present disclosure. The union 510 is similar to the union 10 detailed above with similar elements including a similar label including a leading "5" added to the label with only the differences detailed herein for brevity.

The union 510 includes expansion elements in the form of expansion pins 532 that are received in expansion passages 530 that pass through the body 520. In some embodiments, the union 510 may be provided without the expansion tubes 532 such that pins of a machine may be inserted directly into the expansion passages 530. The expansion engagement of the machine may be expansion pins or shafts that engage the expansion pins 532 to expand the central passage 525 of the union 510 to the expanded diameter and to relax the body 520 of the union 510 such that the central passage 525 returns to the relaxed diameter.

The union 510 includes a groove 527 that increases a diameter of the central passage 525. The groove 527 may be disposed at a midpoint of the inner wall 524. The groove 527 may increase the diameter of the central passage 525 to allow clearance for adhesive 528 to be disposed therein. The adhesive 528 may only be disposed within the groove 527 such that the adhesive 528 does not extend along the entire length of the inner wall 524.

Figure 16:
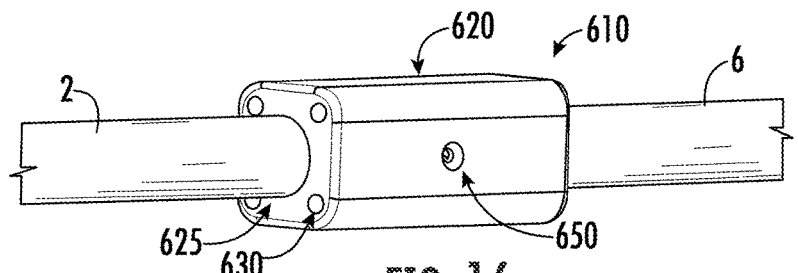
FIG. 16 is a perspective view of another union connecting two fluid conduits together provided in accordance with embodiments of the present disclosure illustrating an injection port for adhesive.
Figure 17:
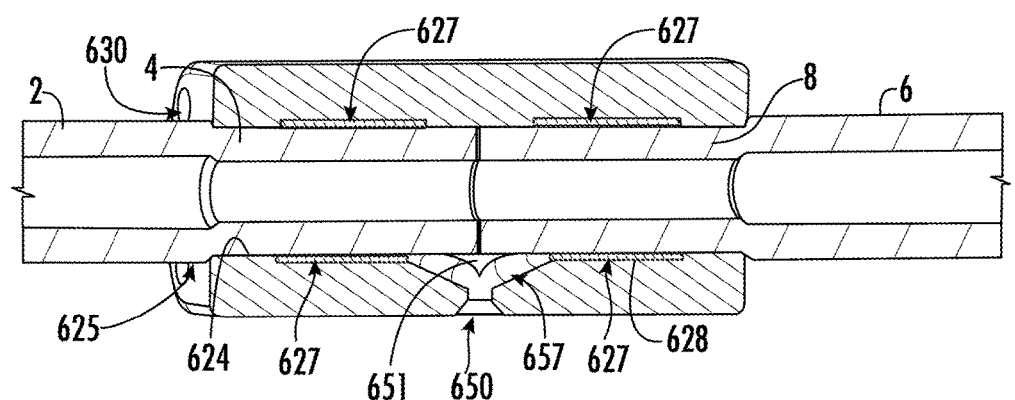
FIG. 17 is a perspective, longitudinal cross-sectional view of the union and the fluid conduits of FIG. 16.

With reference to FIGS. 16 and 17, another union 610 for connecting two fluid conduits is disclosed in accordance with the present disclosure. The union 610 is similar to the union 10 detailed above with similar elements including a similar label including a leading "6" added to the label with only the differences detailed herein for brevity.

The union 610 includes expansion elements in the form of expansion passages 630 that pass through the body 620. In some embodiments, the union 610 may have one or more expansion tubes that are received in the expansion passages 630. The body 620 includes grooves 627 defined in the inner wall 624. As shown, the grooves 627 are disposed on either side of the midpoint with a divider 651 disposed between the grooves 627.

The body 620 includes an injection port 650 that passes through the body 620 at or near a center point or midpoint of the body 620. The injection port 650 is in fluid communication with the central passage 625 via tunnels 657 defined in the body 620. The body 620 may include a divider 651 within the body 620 that is disposed between the tunnels 657. The divider 651 may separate the grooves 627 from one another when the fluid conduits 2, 6 are received within the body 620. For example, when the fluid conduits 2, 6 are received within the body 620, the body 620 and the outside surfaces of the fluid conduits 2, 6 may form adhesive channels in the grooves 627 that are in fluid communication with the injection port 650 via the tunnels 657. In some embodiments, the body 620 is provided without a divider 651 such that a well is disposed between the grooves 627.

The injection port 650 allows for the injection of adhesive 628 into the body 620 when the fluid conduits 2, 6 are received in the central passage 625 such that the adhesive 628 flows through the tunnels 657 and into the grooves 627. For example, the adhesive 628 may be absent from the inner wall 624 until after the fluid conduits 2, 6 are received in the central passage 625 such that after the fluid conduits 2, 6 are received in the central passage 625, the adhesive 628 is inserted through the injection port 650. As the grooves 627 do not extend to the ends of the body 620, the adhesive 628 may not flow to the ends of the body 620 but remains within the grooves 627. The union 610 may be formed by additive manufacturing to define internal passageways for the adhesive 628 to flow, e.g., tunnels 657 and the grooves 627.

Figure 18:
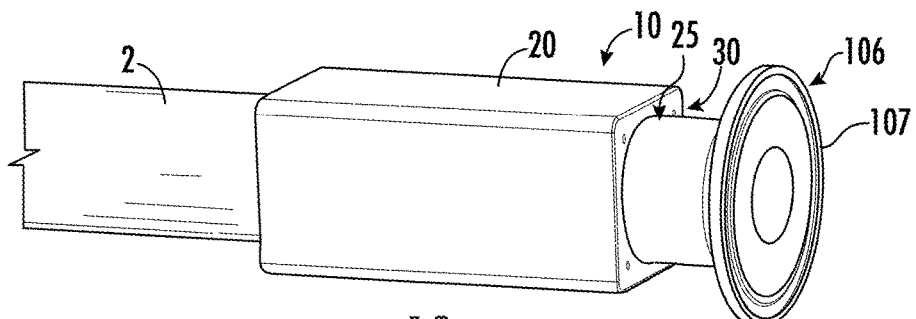
FIG. 18 is a perspective view of another union connecting a fluid conduit and a fitting together provided in accordance with embodiments of the present disclosure.
Figure 19:
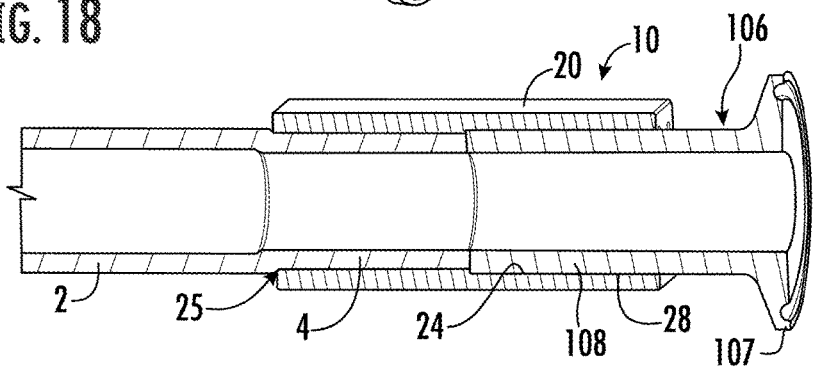
FIG. 19 is a perspective, longitudinal cross-sectional view of the union, the fluid conduit, and the fitting of FIG. 18.

With reference to FIGS. 18 and 19, the union 10 may be used to connect a fluid conduit with a fitting as disclosed in accordance with the present disclosure. While union 10 is shown to connect a fluid conduit with a fitting, it is within the scope of this disclosure that any of the unions disclosed herein may be used to connect a fluid conduit with a fitting. As shown, the union 10 includes expansion elements in the form of expansion passages 30 but may include any expansion unit disclosed herein. The union 10 is used to connect the fluid conduit 2 with a fitting 106 that includes a connection portion 108. As shown, the fitting 106 includes a flange 107, however, the fitting may be any suitable fitting including, but not limited to, a luer connector, a valve, quick coupler, aseptic connector, a hose barb connector, a tri-clamp connection, a tube stub, a sensor, a manifold, or a fluid connector.

With reference to FIGS. 20 and 21, another union 710 for connecting two fluid conduits is disclosed in accordance with the present disclosure. The union 710 is similar to the union 10 detailed above with similar elements including a similar label including a leading "7" added to the label with only the differences detailed herein for brevity.

As shown, the union 710 includes expansion elements in the form of expansion passages 730 but may include any expansion element disclosed herein. The union 710 includes fluid conduit supports 754, 758 that are received within a respective end portion 4, 8 of the fluid conduits 2, 6. The fluid conduit inserts or supports 754, 758 may support the end portions 4, 8 of the fluid conduits 2, 6 to prevent the fluid conduits 2, 6 from collapsing under the constriction or compression of the union 710. In some embodiments, the fluid conduit supports 754, 758 may urge the end portions 4, 8 outward and into engagement with the inner wall 724 of the body 720. The fluid conduit supports 754, 758 may include one or more barbs on an outer surface thereof to secure the fluid conduit supports 754, 758 within the respective end portion 4, 8. The outer surface of the fluid conduit supports 754, 758 may be larger than an inner diameter of the end portion 4, 8 of the respective fluid conduit 2, 6. The fluid conduit supports 754, 758 may be flexible but have more rigidity than the fluid conduits 2, 6 such that the fluid conduit supports 754, 758 reinforce the end portion 4, 8 of the respective fluid conduit 2, 6. The fluid conduit supports 754, 758 may be useful for large bore fluid conduits which may collapse or deform under compressive loads. Large bore fluid conduits may be fluid conduits with an inner diameter in a range of 0.375 inches to 2 inches, e.g., 0.5 inches to 1 inch.

With reference to FIGS. 22 and 23, another union 810 for connecting two fluid conduits is disclosed in accordance with the present disclosure. The union 810 is similar to the union 10 detailed above with similar elements including a similar label including a leading "8" added to the label with only the differences detailed herein for brevity.

As shown, the union 810 includes expansion elements in the form of expansion passages 830 but may include any expansion unit disclosed herein. The union 810 is configured to connect two fluid conduits 2, 6 that have different diameters from one another. As such, the central passage 825 has an inner wall 824 having a first diameter on one side and a second diameter on the other side that is different from the first diameter. The first and second diameters are sized to be smaller than the diameters of the fluid conduits 2, 6 such that the inner walls 824 engage the respective end portions 4, 8 of the fluid conduits 2, 6. The body 820 may define a connector passage 826 as part of the central passage 825 at a midpoint of the body that fluidly connects the fluid conduits 2, 6 when the fluid conduits 2, 6 are fixed within the union 810. The connector passage 826 may have a diameter smaller than an outer diameter of the smaller of the fluid conduits such that each of the fluid conduits 2, 6 abut the body 820 at the connector passage 826. In some embodiments, the body 820 does not include a connector passage 826 such that the fluid conduit having a smaller diameter may extend into the fluid conduit having a larger diameter.

Figure 24:
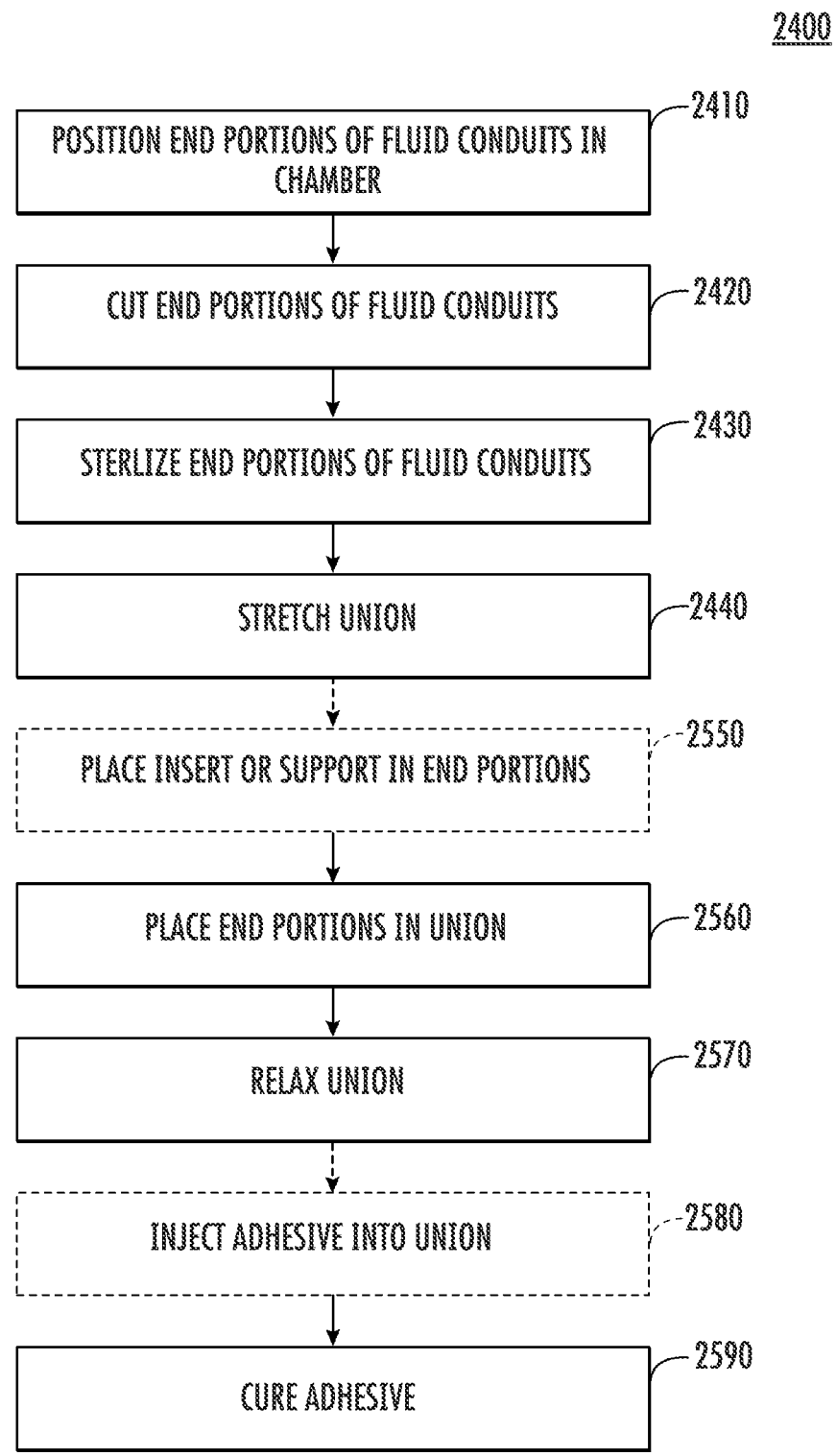
FIG. 24 is a flowchart of a method of connecting two fluid conduits in accordance with embodiments of the present disclosure.

Referring now to FIG. 24, a method of connecting two fluid conduits in an aseptic manner is disclosed in accordance with the present disclosure with reference to the unions of FIGS. 1-23 and is referred to generally as method 2400. The method 2400 may allow for the connection of fluid conduits formed of a variety of materials including thermoplastic and thermoset fluid conduits. For example, the fluid conduits may be formed of a silicone. In some embodiments, the method 2400 may be used to join a fluid conduit with a fitting, e.g., fitting 106.

The ends of the fluid conduits 2, 6 that are to be connected are selected and positioned in a chamber (Step 2410). The chamber may be a chamber of machine that performs the method 2400 autonomously. The ends of the fluid conduits 2, 6 may be sealed when positioned in the chamber. For example, one or both of the ends of the fluid conduits 2, 6 may be sealed with a QuickSeal® available from Sartorius. The fluid conduits 2, 6 may be empty or may be full of fluid. With the ends of the fluid conduits 2, 6 positioned in the chamber, the chamber may prevent contamination of the fluid conduits 2, 6 within the chamber. In embodiments, the chamber may be sterilized, e.g., with ultra-violet light, X-rays, gamma rays, vaporized hydrogen peroxide (VHP), ozone, ethylene oxide, or other oxidizing agents before or after the fluid conduits 2, 6 are positioned in the chamber and the chamber sealed.

With the ends of the fluid conduits 2, 6 positioned in the chamber and the chamber sealed, the ends of the fluid conduits 2, 6 are cut or severed (Step 2420). The ends of the fluid conduits 2, 6 may be cut to remove a closure or seal in an end of the fluid conduits 2, 6 and expose an end portion 4, 8 of the fluid conduits 2, 6 to be connected. Cutting the ends of the fluid conduits 2, 6 may include cutting the ends such that the end portions 4, 8 to be connected are substantially planar in a direction transverse to a central longitudinal axis of a lumen of the fluid conduit 2, 6. When the fluid conduits 2, 6 are filled with fluid, the fluid conduits 2, 6 may be squeezed or clamped adjacent the end portions 4, 8 to prevent fluid from within the fluid conduits 2, 6 from entering the union 10 and/or contacting the adhesive 28 within the union 10. Squeezing or clamping the end portions 4, 8 may prevent or reduce loss of fluids within the fluid conduits 2, 6 or containers fluidly coupled thereto.

The end portions 4, 8 of the fluid conduits 2, 6 to be connected and/or the union 10 to join the fluid conduits 2, 6 are sterilized within the chamber (Step 2430). The sterilization may be accomplished with ultra-violet light, X-rays, gamma rays, or VHP. The sterilization may be completed before or after the ends of the fluid conduits 2, 6 are cut. The union 10 may be sterilized at the same time as the fluid conduits 2, 6 or may be sterilized before the union 10 is placed in the chamber.

With the union 10 and the end portions 4, 8 sterilized, the union 10 may be stretched with a machine or tool to expand the diameter of the central passage 25 of the union 10 to an expanded diameter such that the end portions 4, 8 can pass through the union 10 (Step 2440). The union 10 may be stretched or expanded using various engagement features to engage the expansion elements of the union as detailed above in FIGS. 1-23.

In some embodiments, the method 2400 includes placing inserts or supports in the end portions 4, 8 of the fluid conduits 2, 6 (Step 2550), e.g., inserts 440 (FIG. 13) or supports 754, 758 (FIG. 21). The inserts or supports may be placed in the lumen of the end portions 4, 8 before or after the union 10 is stretched. In certain embodiments, it may be necessary to stretch the union 10 and pass one end portion 4, 8 through the union 10 before the other end portion 4, 8 is positioned on the insert, e.g., insert 440.

With the central passage 25 in the expanded diameter, the end portions 4, 8 are placed or positioned in the union 10 such that the end portions 4, 8 abut one another, or an insert, adjacent the midpoint of the union 10 (Step 2560). In the expand diameter, the central passage 25 has a diameter greater than an outer diameter of the end portions 4, 8. In some embodiments, the central passage 25 may have an expanded diameter 1 percent to 50 percent greater than the outer diameter of the end portions 4, 8.

With the end portions 4, 8 positioned in the union 10, the union 10 is relaxed such that the inner wall 24 of the union 10 contacts or constricts the outer surfaces of the end portions 4, 8 (Step 2570). When the inner wall 24 contacts the outer surfaces of the end portions 4, 8, an adhesive 28 disposed on the inner wall 24 is in contact with the inner wall 24 and the outer surfaces of the end portions 4, 8. In certain embodiments, an adhesive 28 is disposed on the inner wall 24 before insertion of the end portions 4, 8 into the union 10. In some embodiments, an adhesive is injected into the union through an injection port (Step 2580), e.g., injection port 650 (FIG. 17). In some embodiments, the adhesive is a LIM 8040, Silopren UV70EX, or Santoprene 8291TL. In certain embodiments, the end portion may be surface treated to enhance bonding, e.g., plasma treated, deep UV treated (VUV treatment), coated with silane coupling agents, and/or coated with a primer, e.g., MED 161 from Nusil or SS4155 from Momentive. For additional information on a deep UV treatment see Dr. Sigmar Rudakowski, "UV light—A powerful tool for surface treatment" (2010), available at https://www.circuitnet.com/news/uploads/1/Xeradex_VUV.pdf.

When the union 10 is relaxed, the union 10 may be self-biased to contact or constrict the outer surfaces of the end portions 4, 8. The central passage 25 may have a relaxed diameter that is 1 percent to 10 percent less than an outer diameter of the end portions 4, 8. In certain embodiments, when the union 10 is relaxed, the engagement elements may be used to urge the central passage 25 towards its relaxed diameter to apply additional pressure to the outer surfaces of the end portions 4, 8. This additional pressure may be held through curing and released after curing is completed. In some embodiments, with a surface treatment, the union 10 may connect the end portions 4, 8 without an adhesive.

When the union 10 is relaxed such that the inner wall 24 of the union 10 applies pressure to the end portions 4, 8, the adhesive 28 is cured (Step 2590). The adhesive 28 may be cured with a variety of means including, but not limited to, heat and/or UV light. When the adhesive 28 is cured, the union 10 with the end portions 4, 8 fixed therewithin, is released and removable from within the chamber.

The method 2400 may be completed within the chamber by a machine that automates the method 2400 once the fluid conduits 2, 6 are selected. The method 2400 as detailed above primarily with reference to union 10 but it should be appreciated that any of the unions detailed herein may be used with the method 2400. The method 2400 may be used to connect fluid conduits and/or fittings of the same material or of different materials. The method 2400 may be used to connect fluid conduits with both mechanical compression and the bond of the cured adhesive. In some embodiments, the method 2400 may be used to connect fluid conduits with only mechanical compression or expansion. The method 2400 may be used without the use of a molding machine and/or may be accomplished without tooling for molding. The method 2400 may be accomplished without the need to contact an inside of the fluid conduit which may avoid potential contamination, debris, or particulates in the union. In addition, the method 2400 may be used with any of the unions detailed below with the fluid conduits being disposed over the union or being disposed within the union.

Figure 25:
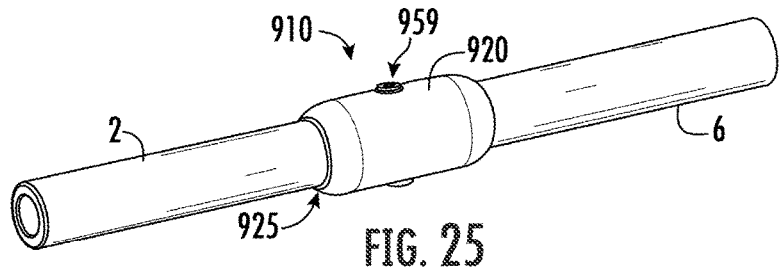
FIG. 25 is a perspective view of another union connecting two fluid conduits together provided in accordance with embodiments of the present disclosure.
Figure 26:
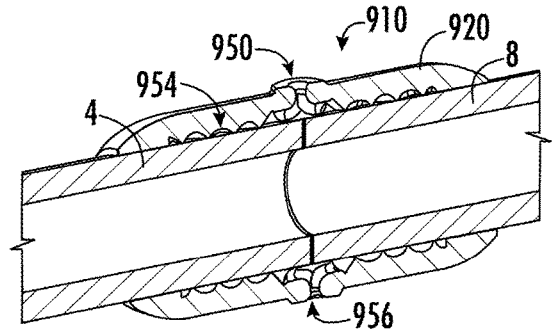
FIG. 26 is a perspective, longitudinal cross-sectional view of a portion of the union and the fluid conduits of FIG. 25.

Referring now to FIGS. 25-26, another union or collar 910 for connecting two fluid conduits is disclosed in accordance with the present disclosure. The union 910 is similar to the union 10 detailed above with similar elements including a similar label including a leading "9" added to the label with only the differences detailed herein for brevity.

Figure 27:
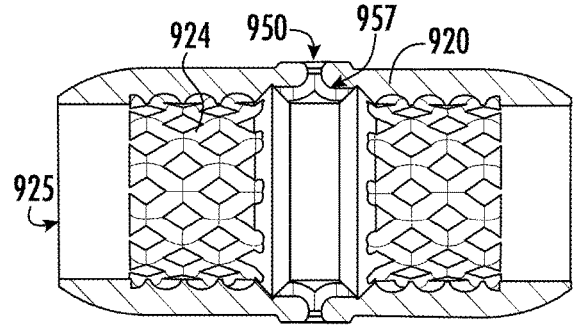
FIG. 27 is a longitudinal cross-sectional view of the union of FIG. 25.

The union 910 includes a body 920 that may be rigid or flexible. As used herein the term "rigid" means a material devoid of flexibility. The body 920 defines one or more injection ports 950 that are in communication with adhesive channels 954 defined between the body 920 and the end portions 4, 8 of the fluid conduits 2, 6. When the body 920 is disposed over the end portions 4, 8, adhesive is injected through the injection port 950 and into the adhesive channels 954 to bond the body 920 to the end portions 4, 8. The adhesive may be cured with heat and/or UV light. With particular reference to FIG. 27, the inner wall 924 of the body 920 may include one or more elements to enhance the bond between the adhesive and the body 920. As shown, the inner wall 924 includes ridges to increase a surface area of the inner wall 924. In certain embodiments, the end portions 4, 8 may be treated to enhance the bonding between the adhesive and the outer surface thereof.

Figure 28:
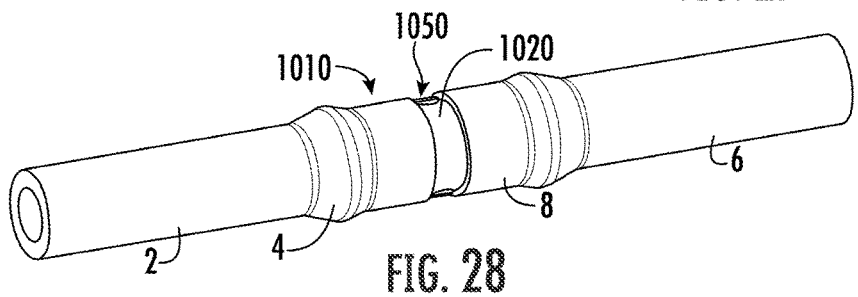
FIG. 28 is a perspective view of another union connecting two fluid conduits together provided in accordance with embodiments of the present disclosure.
Figure 29:
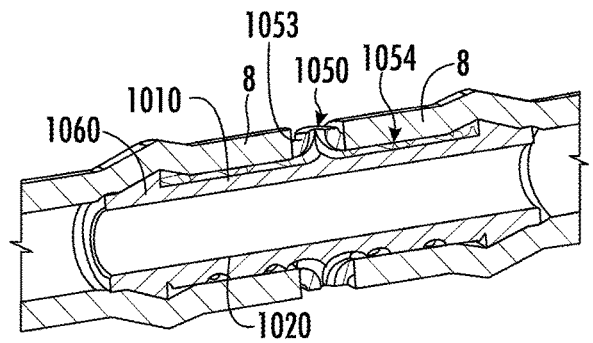
FIG. 29 is a perspective, longitudinal cross-sectional view of a portion of the union and the fluid conduits of FIG. 28.
Figure 30:
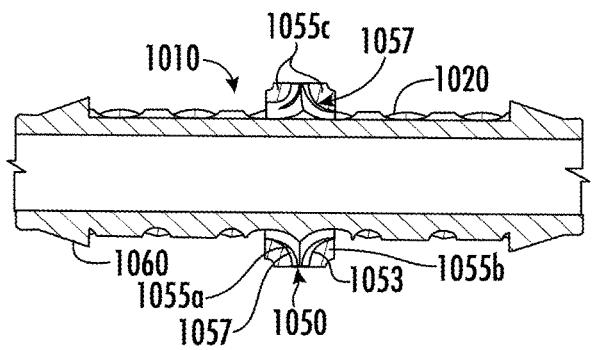
FIG. 30 is a longitudinal cross-sectional view of the union of FIG. 28.

Referring now to FIGS. 28-30, another union or collar 1010 for connecting two fluid conduits is disclosed in accordance with the present disclosure. In contrast to the bodies detailed above, the union 1010 is configured to be disposed entirely or at least partially within the fluid conduits 2, 6 as detailed below. The union 1010 is similar to the union 10 detailed above with similar elements including a similar label including a leading "10" added to the label with only the differences detailed herein for brevity.

The union 1010 includes a body 1020 that may be rigid or flexible. The body 1020 defines one or more injection ports 1050 that are in communication with adhesive channels 1054 defined between the body 1020 and the end portions 4, 8 of the fluid conduits 2, 6. When the end portions 4, 8 are disposed over the body 1020, the end portions 4, 8 may abut the sides 1055a, 1055b of a protrusion 1053 that defines the injection port 1050. The adhesive is injected into the adhesive channels 1054 via the injection port 1050 to bond the body 1020 to the end portions 4, 8. The injection ports 1050 may be defined through the protrusion 1053 that extends from an outer wall of the body 1020. The protrusion 1053 may be positioned at a midpoint of the body 1020. The protrusion 1053 has a first sidewall 1055a that abuts the first end portion 4 and a second side wall 1055b that abuts the second end portion 8. The first sidewall 1055a and the second sidewall 1055b may define recesses 1055c that are configured to receive and form a seal with the first end portion 4 and the second end portion 8. The protrusion 1053 may extend from the outer wall of the body 1020 such that the adhesive can flow through tunnels 1057 defined in the protrusion 1053 and into the adhesive channels 1054 defined between the body 1020 and inside surfaces of fluid conduits 2, 6 received over end portions 4, 8, of the union 1010.

In some embodiments, the body 1020 may include barbs 1060 adjacent ends of the body 1020 to secure the end portions 4, 8 thereto. The barbs 1060 may have a diameter that is greater than an inner diameter of the end portions 4, 8 such that the end portions 4, 8 are stretched over a respective barb 1060 and the barb 1060 resists removal of the end portions 4, 8 from over the body 1020. The barbs 1060 may end the adhesive channels adjacent each end of the body 1020. The adhesive may be cured with heat and/or UV light to bond to the body 1020 and the end portions 4, 8. With particular reference to FIG. 30, the outer wall of the body 1020 may include one or more elements to enhance the bond between the adhesive and the body 1020. As shown, the outer wall of the body 1020 includes ridges to increase a surface area of the outer wall. In certain embodiments, inner surfaces of the end portions 4, 8 may be treated to enhance the bonding between the adhesive and the inner surface thereof.

Referring now to FIGS. 31 and 32, another union or collar 1110 for connecting two fluid conduits is disclosed in accordance with the present disclosure. The union 1110 is similar to the union 10 detailed above with similar elements including a similar label including a leading "11" added to the label with only the differences detailed herein for brevity.

The union 1110 includes a body 1120 that that is formed of two tubular members 1122, 1123. Each of the tubular members 1122, 1123 is secured to an outer surface of a respective end portion 4, 8 of the fluid conduits 2, 6. Each of the tubular members 1122, 1123 includes a leading edge or flange 1162, 1163. The end portions 4, 8 may pass entirely through the tubular members 1122, 1123 such that the end portions 4, 8 extend from a respective one of the flanges 1162, 1163. The body 1120 may be formed of a thermoplastic material, e.g., a polycarbonate material. The tubular members 1122, 1123 may be secured to the outer surfaces of the end portions 4, 8 by adhesive or mechanical means. For example, each of the tubular members 1122, 1123 may have an adhesive disposed on an inner wall 1124 thereof to secure the tubular member 1122, 1123 to a respective end portion 4, 8.

To connect the fluid conduits 2, 6, the fluid conduits 2, 6 and the leading edges 1162, 1163 of the tubular members 1122, 1123 are contacted or cut with a heated blade. The heated blade may also cut the end portions 4, 8 flush with the leading edges 1162, 1163. The leading edges 1162, 1163 and leading edges 5, 9 of the end portions 4, 8 are pressed into one another such that the leading edges 1162, 1163 are fused together to form a flange 1164 that connects the end portions 4, 8 together. In some embodiments, the leading edges 5, 9 of the end portions 4, 8 abut one another when the flange 1164 is formed. In certain embodiments, the leading edges 5, 9 may be fused together.

Referring now to FIGS. 33-35, another union or collar 1210 for connecting two fluid conduits is disclosed in accordance with the present disclosure. The union 1210 is similar to the union 1110 detailed above with similar elements including a similar label including a leading "12" replacing the leading "11" of the previous label with only the differences detailed herein for brevity.

The union 1210 includes a body 1220 that is formed of two tubular members 1222, 1223 and a collar 1260. Each of the tubular members 1222, 1223 is secured to an outer surface of a respective end portion 4, 8 of the fluid conduits 2, 6. Each of the tubular members 1222, 1223 includes a leading surface 1262, 1263. The end portions 4, 8 may pass entirely through the tubular members 1222, 1223 such that the end portions 4, 8 extend from a respective one of the flanges 1262, 1263. The collar 1260 includes a groove 1261 defined in the inner surface thereof. The groove 1261 may be disposed at the center of the inner surface of the collar 1260. The collar 1260 includes an inductive element 1266 received within the groove 1261. The inductive element 1266 may be a mesh or screen that forms a disk with an open center similar to a washer. The inductive element 1266 is configured to be heated by an external source of inductive energy. The inductive element 1266 may be sized to have a surface area to cover the leading edges 1262, 1263 of the tubular members 1222, 1223. In some embodiments, the inductive element 1266 may be sized to have a surface area to cover the leading edges 1262, 1263 of the tubular members 1222, 1223 and the leading edges 5, 9 of the end portions 4, 8. The body 1220 may be formed of a thermoplastic material, e.g., a polycarbonate material.

To connect the fluid conduits 2, 6, the fluid conduits 2, 6 and the leading edges 1262, 1263 of the tubular members 1222, 1223 are made flush with the leading edges 5, 9 of the fluid conduits 2, 6. In some embodiments, leading edges 1262, 1263 and/or the leading edges 5, 9 are cut to be flush with one another. In certain embodiments, the leading edges 1262, 1263 and/or the leading edges 5, 9 are cut with a heated blade. Once cut, the leading edges 1262, 1263 are pressed together within the collar 1260 such that the leading edges 1262, 1263 are adjacent or abut the inductive element 1266. With the leading edges 1262, 1263 adjacent or in abutment with the inductive element 1266, the inductive element 1266 is heated such that the leading edges 1262, 1263 are welded or fused together by the heat provided by the inductive element 1266. In particular embodiments, the leading edges 5, 9 may also be welded or fused together by the heat provided by the inductive element 1266.

Figure 36:
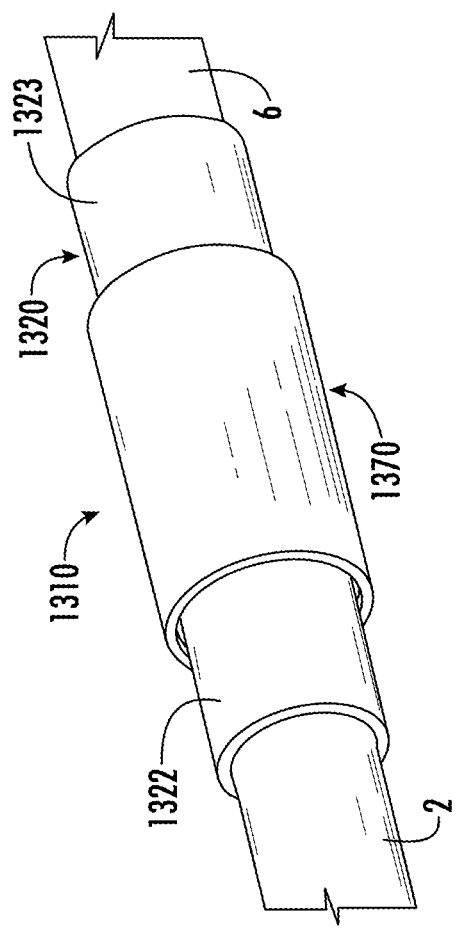
FIG. 36 is a perspective view of another union connecting two fluid conduits together provided in accordance with embodiments of the present disclosure.
Figure 37:
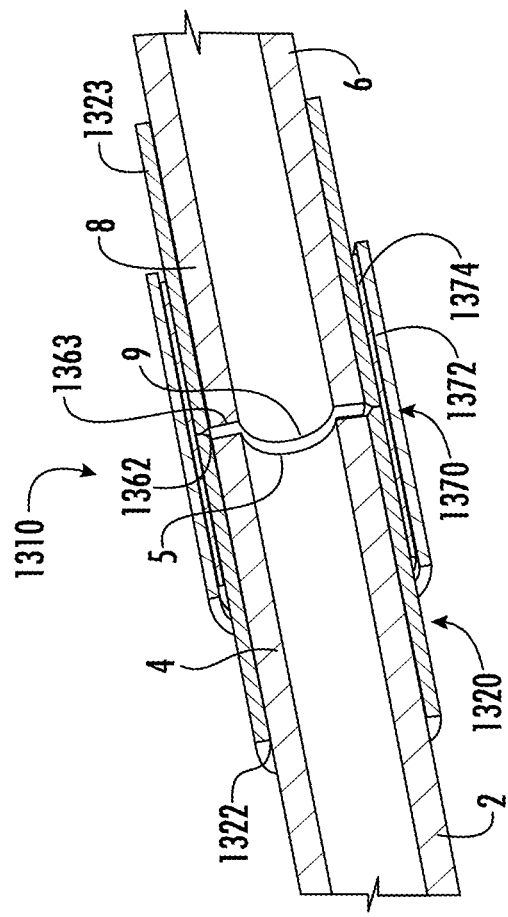
FIG. 37 is a perspective, longitudinal cross-sectional view of a portion of the union and the fluid conduits of FIG. 36.

Referring now to FIGS. 36 and 37, another union or collar 1310 for connecting two fluid conduits is disclosed in accordance with the present disclosure. The union 1310 is similar to the union 10 detailed above with similar elements including a similar label including a leading "13" added to the label with only the differences detailed herein for brevity.

The union 1310 includes a body 1320 that is formed of two tubular members 1322, 1323. Each of the tubular members 1322, 1323 is secured to an outer surface of a respective end portion 4, 8 of the fluid conduits 2, 6. Each of the tubular members 1322, 1323 includes a leading surface 1362, 1363. The end portions 4, 8 may pass entirely through the tubular members 1322, 1323 such that the end portions 4, 8 extend from a respective one of the flanges 1362, 1363. The body 1320 may be formed of a polycarbonate material. The collar 1310 includes a crimp tube 1370. The crimp tube 1370 includes an outer tube 1372 and may include an inner tube 1374. The outer tube 1372 is formed of a metal suitable for crimping or deformation to secure the fluid conduits 2, 6 as detailed below. The outer tube 1372 may be formed of steel, aluminum, or other suitable metal for crimping. The inner tube 1374 may be a silicon tube that is adhered or bonded to an inside surface of the outer tube 1372. The inner tube 1374 may provide a seal on an outer surface of the tubular members 1322, 1323. In certain embodiments, the crimp tube 1370 is provided without the inner tube 1374.

To connect the fluid conduits 2, 6, the fluid conduits 2, 6 and the leading edges 1362, 1363 of the tubular members 1322, 1323 are formed or cut to be flush with one another. The end portions 4, 8 of the fluid conduits 2, 6 and the tubular members 1322, 1323 are positioned in the crimp tube 1370 with the leading edges 5, 9 and 1362, 1363 adjacent or in abutment with one another. The outer tube 1372 of the crimp tube 1370 is then crimped over the tubular members 1322, 1323 such that the fluid conduits 2, 6 are connected to one another. In embodiments with the inner tube 1374, the inner tube 1374 may be compressed on the outer surface of the tubular members 1322, 1323.

Figure 38:
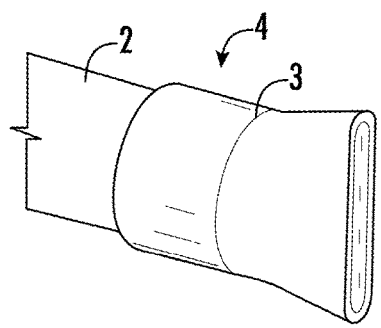
FIG. 38 is a perspective view of a sealed disconnect device provided in accordance with the present disclosure.
Figure 39:
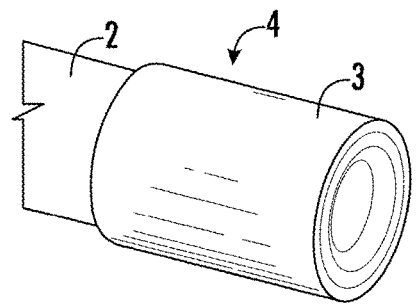
FIG. 39 is a perspective view of the disconnect device of FIG. 39 after being transitioned to an open state after being sealed in accordance with the present disclosure.

With reference to FIGS. 38 and 39, one or both of the fluid conduits 2, 6 to be connected may be sealed with a disconnect device 3. The disconnect device 3 may be a QuickSeal® available from Sartorius. As shown in FIG. 38, the disconnect device 3 is crimped such that the leading end 5 of the fluid conduit 2 is sealed. To open the leading end 5, the disconnect device 3 is placed in a cylindrical or barrel die in a sealed state and compressed to return the disconnect device 3 to an open state as shown in FIG. 39. The disconnect device 3 may be secured to the outer surface of the fluid conduit 2 such that the disconnect device 3 remains in position along the fluid conduit 2. The end portion 4 including the disconnect device 3 may be sterilized before or after being transitioned to the open state. The other fluid conduit 6 may include a similar disconnect device 7 that is transitioned from a sealed state to an open state in a similar manner.

Once the disconnect device 3 is in the open state, the fluid conduit 2 may be joined with another fluid conduit with any of the suitable unions detailed herein. While some unions are detailed below with reference to FIGS. 40-45 for use with disconnect devices that have been transitioned from a sealed state to an open state, any of the unions detailed herein may be used with a disconnect device that has been transitioned to an open state. In addition, the disconnect device may be transitioned to the open state in an automated process by a machine performing a method of connecting the fluid conduits, e.g., method 2400. In some embodiments, a fluid conduit with a disconnect device that has been transitioned to an open state with a fluid conduit without a disconnect device.

Figure 40:
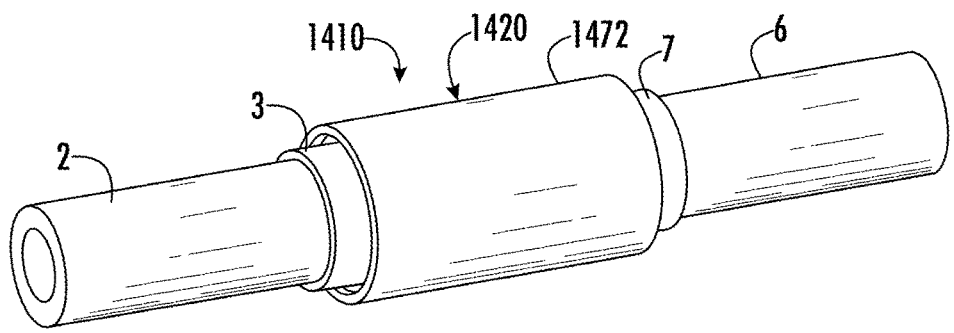
FIG. 40 is a perspective view of another union connecting two fluid conduits together provided in accordance with embodiments of the present disclosure with at least one of the disconnect devices being previously sealed.
Figure 41:
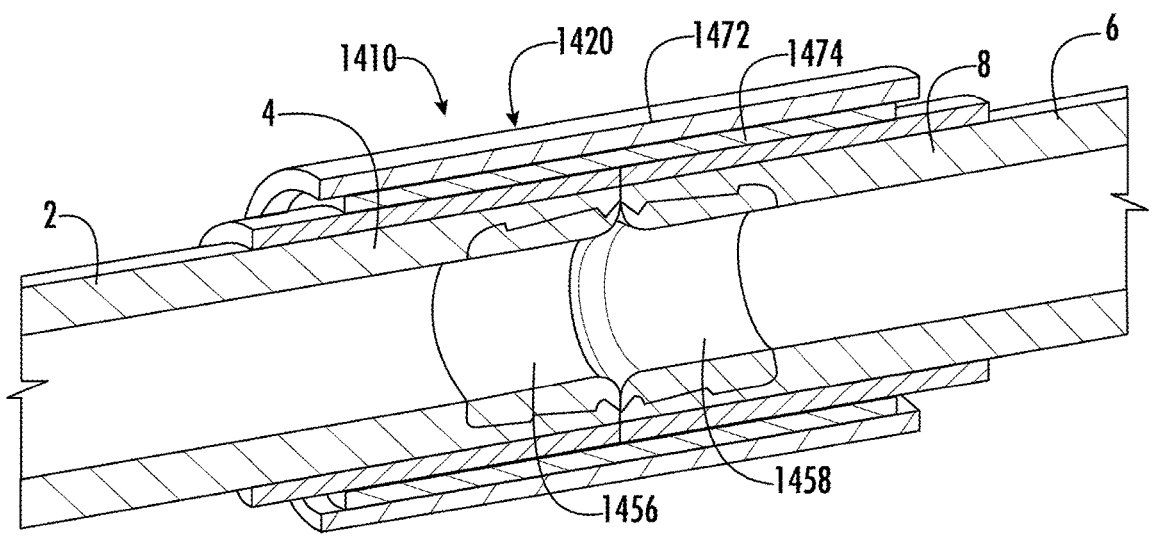
FIG. 41 is a perspective, longitudinal cross-sectional view of a portion of the union and the fluid conduits of FIG. 40.

Referring now to FIGS. 40 and 41, another union or collar 1410 for connecting two fluid conduits is disclosed in accordance with the present disclosure. The union 1410 is similar to the union 10 detailed above with similar elements including a similar label including a leading "14" added to the label with only the differences detailed herein for brevity.

The collar 1410 includes a body 1420 having an outer tube 1472 and may include an inner tube 1474. The outer tube 1472 is formed of a metal suitable for crimping or deformation to secure the fluid conduits 2, 6 as detailed below. The outer tube 1472 may be formed of steel, aluminum, or other suitable metal for crimping. The inner tube 1474 may be a silicon tube that is adhered or bonded to an inside surface of the outer tube 1472. The inner tube 1474 may provide a seal on an outer surface of the tubular members 1422, 1423. In certain embodiments, the crimp tube 1470 is provided without the inner tube 1474.

To connect the fluid conduits 2, 6, the fluid conduits 2, 6 and the leading edges 1462, 1463 of the tubular members 1422, 1423 are formed or cut to be flush with one another. The end portions 4, 8 of the fluid conduits 2, 6 and the tubular members 1422, 1423 are positioned in the crimp tube 1470 with the leading edges 5, 9 and 1462, 1463 adjacent or in abutment with one another. Positioning the end portions 4, 8 in the crimp tube 1470 may include positioning the opened disconnect devices 3, 7 within the crimp tube 1470. The outer tube 1472 of the crimp tube 1470 is then crimped over the tubular members 1422, 1423 such that the fluid conduits 2, 6 are connected to one another. In embodiments with the inner tube 1474, the inner tube 1474 may be compressed on the outer surface of the tubular members 1422, 1423. In some embodiments, an insert 1456, 1458 is disposed within a respective end portion 4, 8 of the fluid conduits 2, 6 to support the respective end portion 4, 8. The inserts 1456, 1458 may prevent the respective end portion 4, 8 from collapsing when the outer tube 1472 is crimped over the end portions 4, 8.

Figure 42:
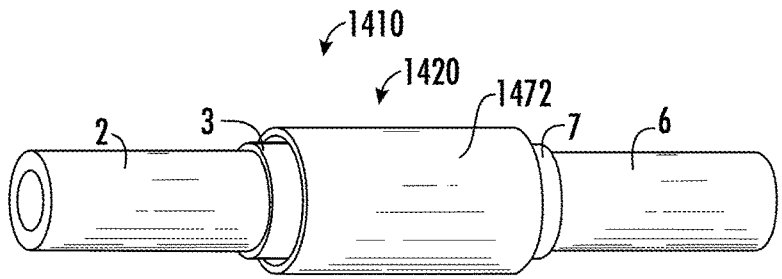
FIG. 42 is a perspective view of another union connecting two fluid conduits together provided in accordance with embodiments of the present disclosure with at least one of the disconnect devices being previously sealed.
Figure 43:
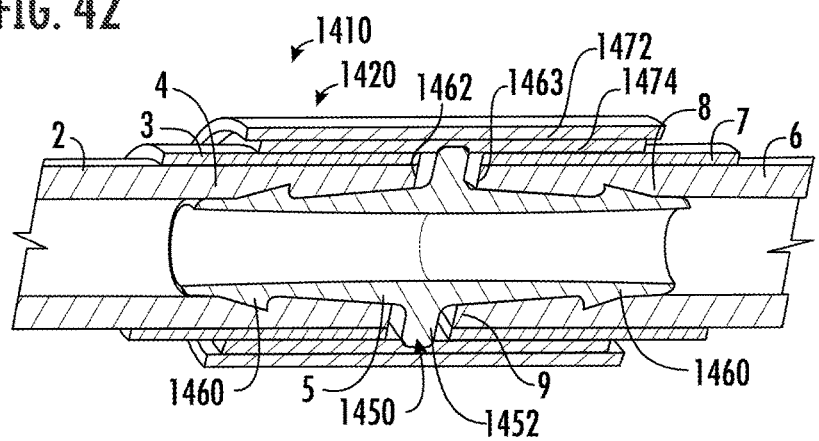
FIG. 43 is a perspective, longitudinal cross-sectional view of a portion of the union and the fluid conduits of FIG. 42.

Referring now to FIGS. 42 and 43, the union 1410 may be used with an insert 1450 that may be inserted in each of the fluid conduits 2, 6. The insert 1450 may include a central flange 1452 and may include a barb 1460. In use, the fluid conduits 2, 6 are slid onto the insert 1450 until the leading ends 5, 9 of the fluid conduits 2, 6 are adjacent or in abutment with a central flange 1452 of the insert 1450. In embodiments with the barb 1460, the leading ends 5, 9 are slid over the barb 1460 such that the barbs 1460 prevent the end portions 4, 8 from being removed from the insert 1450. The insert 1450 may support the end portions 4, 8 from collapsing when the outer tube 1472 is crimped.

Figure 44:
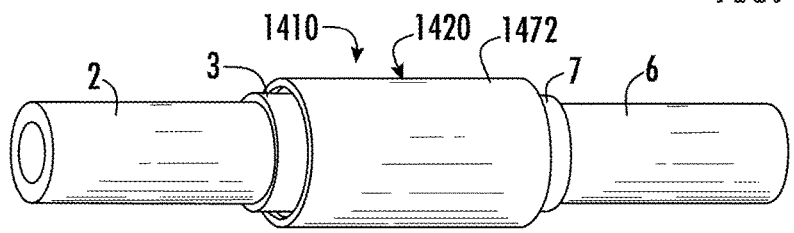
FIG. 44 is a perspective view of another union connecting two fluid conduits together provided in accordance with embodiments of the present disclosure with at least one of the disconnect devices being previously sealed.
Figure 45:
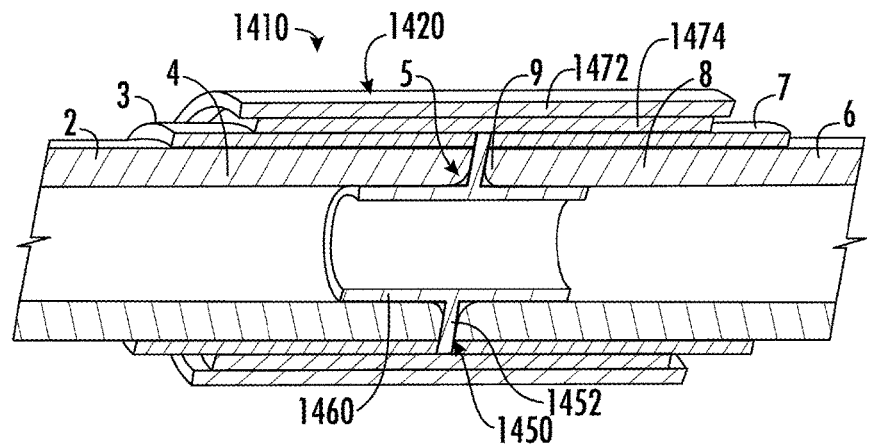
FIG. 45 is a perspective, longitudinal cross-sectional view of a portion of the union and the fluid conduits of FIG. 44.

Referring now to FIGS. 44 and 45, the union 1410 may be used with another insert 1450 that may be inserted in each of the fluid conduits 2, 6. The insert 1450 may include a central flange 1452. In use, the fluid conduits 2, 6 are slid onto the insert 1450 until the leading ends 5, 9 of the fluid conduits 2, 6 are adjacent or in abutment with a central flange 1452 of the insert 1450. The insert 1450 may support the end portions 4, 8 from collapsing when the outer tube 1472 is crimped.

The unions detailed herein may be formed of a variety of materials including, but not limited to perfluoropolyether elastomers or phenyl containing silicone. The materials of the union may be silicone in the 20 to 80 Shore A hardness range, e.g., in a hardness range of Shore A 40-60. The unions may be used to connect thermoplastic elastomer tubing, e.g., TuFlux® TPE available from Sartorius or C-Flex® available from Saint Gobain.

The unions detailed herein may provide uniform application of adhesive which may allow for the use of less adhesive. The unions detailed herein may have a lower cost than currently available aseptic connectors, e.g., AseptiQuik® Sterile connectors available from CPC Worldwide, Opta® connectors available from Sartorius, or ReadyMate connectors available from Cytiva. The unions detailed herein may create an all silicone fluid pathway or lumen for connected fluid conduits. The unions detailed herein may have an increased surface area for bonding and thus, may be more robust than currently available connectors or unions. The unions detailed herein may be formed by additive manufacturing techniques and incorporate internal fluid pathways for adhesive. In some embodiments, forming the unions by additive manufacturing may allow for tunable compression. As noted above, deep UV (VUV) may be used to activate the exterior of a silicon fluid conduit such that the compression of the union may allow for connection without adhesive. In embodiments, the fluid conduits, inserts, unions, pins for the unions, tubing for the unions, or other structures detailed herein may be treated with a primer to chemically bond silicone to the treated element which may improve the load carrying ability of the treated element to prevent tearing of the union. The pins detailed above may be bound to a silicone union by molding the union using self-bonding silicone adhesive such that primer is not required.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:
1. An assembly comprising:
a first fluid conduit;
a second fluid conduit;
a union aseptically connecting the first fluid conduit and the second fluid conduit, the union including a body defining a central passage about a central longitudinal axis of the body, the body having a first side and a second side, the first side securing the first fluid conduit to the body, the second side securing the second fluid conduit to the body, the body defining a first adhesive channel between the first fluid conduit and the first side of the body and a second adhesive channel between the second fluid conduit and the second side of the body, the body defining an injection port positioned at a midpoint of the body, the injection port in fluid communication with the first adhesive channel and the second adhesive channel, the injection port configured to deliver adhesive into the first adhesive channel and the second adhesive channel with the first fluid conduit and the second fluid conduit disposed about the first side and the second side, respectively; and
an adhesive disposed between the body of the union and the first fluid conduit and disposed between the body of the union and the second fluid conduit to secure the first fluid conduit and the second fluid conduit to the union such that the first fluid conduit and the second fluid conduit are in fluid communication with one another.

2. The assembly according to claim 1, wherein the body of the union has an outer wall that forms an outer surface of the first side and the second side, the outer wall receiving the first fluid conduit thereabout and the second fluid conduit thereabout.

3. The union according to claim 2, wherein the outer wall includes ridges that increase the surface area of the outer surface.

4. The union according to claim 3, wherein the ridges are configured to enhance the bond between the adhesive and the body of the union.

5. The assembly according to claim 2, wherein the outer wall of the body of the union is continuous to separate the outer surface from the central passage from a first end of the body to a second end of the body.

6. The assembly according to claim 2, wherein the body of the union includes a protrusion that extends from the outer wall of the body between the first side and the second side, the protrusion having a first sidewall that abuts the first fluid conduit when the first fluid conduit is disposed about the first side, the protrusion having a second sidewall that abuts the second fluid conduit when the second fluid conduit is disposed about the second side, the protrusion defining the injection port.

7. The assembly according to claim 6, wherein the protrusion defines a first tunnel that extends from the injection port to a first tunnel outlet defined by the first sidewall of the protrusion and a second tunnel that extends from the injection port to a second tunnel outlet defined by the second sidewall to place the injection port in fluid communication with the first adhesive channel and the second adhesive channel when the first fluid conduit and the second fluid conduit are disposed about the first side and the second side, respectively.

8. The union according to claim 6, wherein the protrusion extends from the outer wall of the body at a midpoint thereof.

9. The assembly accordingly to claim 2, wherein the body of the union includes a first barb that extends from the outer wall adjacent a first end of the body and a second barb that extends from the outer wall adjacent a second end of the body, the first barb engaged with an inside surface of the first fluid conduit to secure the first fluid conduit to the first side, the second barb engaged with an inside surface of the second fluid conduit to secure the second fluid conduit to the second side, the first barb forming a first channel end of the first adhesive channel and the second barb forming a second channel end of the second adhesive channel, the first barb engaged with the inside surface of the first fluid conduit and the second barb is engaged with the inside surface of the second fluid conduit such that the adhesive is entirely contained within the first adhesive channel and the second adhesive channel.

10. A method of joining two fluid conduits in an aseptic manner, the method comprising:
   positioning a first fluid conduit over a first side of a body of a union;
   positioning a second fluid conduit over a second side of the body such that a lumen of the first fluid conduit is in fluid communication with a lumen of the second fluid conduit;
   injecting an adhesive through an injection port defined in the body such that the adhesive flows into a first adhesive channel defined between the body and the first fluid conduit and a second adhesive channel defined between the body and the second fluid conduit; and
   curing the adhesive such that the first fluid conduit and the second fluid conduit are bonded to the body.

11. The method according to claim 10, wherein positioning the first fluid conduit includes positioning the first fluid conduit over the first side of the body until an end of the first fluid conduit abuts a protrusion of the body, the protrusion of the body defining the injection port.

12. The method according to claim 11, wherein injecting the adhesive through the injection port include the adhesive flowing through tunnels that fluidly connect the injection port and the first fluid conduit and the second fluid conduit.

13. The method according to claim 10, wherein curing the adhesive includes joining the first fluid conduit and the second fluid conduit in an aseptic manner.

14. The method according to claim 10, wherein curing the adhesive includes applying heat to the first side of the body and the second side of the body.

15. The method according to claim 10, wherein curing the adhesive includes applying ultraviolet light to first side of the body and the second side of the body.

16. The method according to claim 10, comprising treating an inside side surface of the first fluid conduit and an inside surface of the second fluid conduit with a surface treatment configured to enhance bonding of the adhesive to first fluid conduit and the second fluid conduit.

* * * * *